(12) United States Patent
Waters et al.

(10) Patent No.: US 9,370,255 B2
(45) Date of Patent: *Jun. 21, 2016

(54) CRIB SHIELD SYSTEM AND OTHER BREATHABLE APPARATUS

(75) Inventors: Dale Richard Waters, Eagan, MN (US); Susan Marie Waters, Eagan, MN (US)

(73) Assignee: BreathableBaby, LLC, Minnetonka, MN (US)

( * ) Notice: Subject to any disclaimer, the term of this patent is extended or adjusted under 35 U.S.C. 154(b) by 784 days.

This patent is subject to a terminal disclaimer.

(21) Appl. No.: 13/238,878

(22) Filed: Sep. 21, 2011

(65) Prior Publication Data

US 2012/0030879 A1    Feb. 9, 2012

Related U.S. Application Data

(60) Continuation-in-part of application No. 12/429,734, filed on Apr. 24, 2009, now Pat. No. 8,220,088, which is a division of application No. 11/446,017, filed on Jun. 2, 2006, now Pat. No. 7,523,513, which is a (Continued)

(51) Int. Cl.
    *A47D 7/00*          (2006.01)
    *A47D 13/06*        (2006.01)
    (Continued)

(52) U.S. Cl.
    CPC .. *A47D 7/00* (2013.01); *A47D 9/00* (2013.01); *A47D 13/025* (2013.01); *A47D 13/06* (2013.01);
    (Continued)

(58) Field of Classification Search
    CPC ... A47D 13/063; A47D 13/061; A47D 13/06; A47D 9/00; A47D 9/005; A47D 15/00; A47D 15/008; A47D 7/00; A47D 7/002

USPC .......... 5/424, 425, 427, 93.1, 99.1, 100, 663, 5/946, 922, 655
See application file for complete search history.

(56) References Cited

U.S. PATENT DOCUMENTS 1,056,712 A    3/1913    Schweda
2,128,978 A    9/1938    Akin
(Continued)

FOREIGN PATENT DOCUMENTS

DE    10 2006 024855 A1    12/2007
FR        2 867 045 A1    9/2005
(Continued)

OTHER PUBLICATIONS

"Safe-N-Secure Crib Liner" datasheet [online]. Tender Creations, Inc., Southampton, MN, [retrieved on Feb. 4, 2000]. Retrieved from the Internet:<URL:http//www.tendercreations.com/cribliner.htm>; 8 pgs.

(Continued)

*Primary Examiner* — Robert G Santos
(74) *Attorney, Agent, or Firm* — Norton Rose Fulbright US LLP

(57) ABSTRACT

An apparatus and method for making same utilizing a breathable mesh material having a reduced suffocation resistance level for infant and toddler use. The breathable mesh material includes an inner and outer fabric that includes larger openings on the front substructure than on the back substructure and a pile substructure is integrated and extends between the front and back substructures allowing air to substantially move effectively therethrough.

29 Claims, 33 Drawing Sheets

Related U.S. Application Data continuation of application No. 10/738,616, filed on Dec. 16, 2003, now Pat. No. 7,055,192.

(60) Provisional application No. 60/434,324, filed on Dec. 17, 2002.

(51) Int. Cl.
*A47D 15/00* (2006.01)
*A47D 9/00* (2006.01)
*A47D 13/02* (2006.01)
*A47G 27/02* (2006.01)
*A47G 27/06* (2006.01)
*A47G 9/08* (2006.01)
*A63F 3/00* (2006.01)

(52) U.S. Cl.
CPC ............ *A47D 15/006* (2013.01); *A47D 15/008* (2013.01); *A47G 9/083* (2013.01); *A47G 27/0212* (2013.01); *A47G 27/065* (2013.01); *A47D 13/063* (2013.01); *A47D 15/00* (2013.01); *A63F 2003/00457* (2013.01); *Y10T 29/49826* (2015.01)

(56) References Cited

U.S. PATENT DOCUMENTS

| | | | |
|---|---|---|---|
| 2,566,790 A | 9/1951 | Bloomfield | |
| 2,727,242 A | 2/1954 | Pascal | |
| 2,784,420 A | 3/1957 | Moltane | |
| 2,808,596 A | 10/1957 | Schreiner | |
| 2,927,331 A | 3/1960 | Ruiz | |
| 3,103,669 A | 9/1963 | Mundis | |
| 3,183,527 A | 5/1965 | Turner | |
| 3,199,123 A | 8/1965 | Komiske | |
| 3,325,832 A | 6/1967 | Malicki | |
| 3,438,069 A | 4/1969 | Long | |
| 3,619,824 A | 11/1971 | Doyle | |
| 3,882,871 A | 5/1975 | Taniguchi | |
| 4,232,415 A | 11/1980 | Webber | |
| 4,280,342 A | 7/1981 | Eng et al. | |
| 4,370,765 A | 2/1983 | Webber | |
| 4,526,830 A | 7/1985 | Ferziger et al. | |
| 4,579,753 A | 4/1986 | Gjendemsjo | |
| 4,644,591 A | 2/1987 | Goldberg | |
| 4,670,923 A | 6/1987 | Gabriel et al. | |
| 4,750,225 A | 6/1988 | Simons et al. | |
| 4,767,419 A | 8/1988 | Fattore | |
| 4,922,565 A | 5/1990 | Blake | |
| 5,010,611 A | 4/1991 | Mallett | |
| 5,086,530 A | 2/1992 | Blake | |
| 5,093,947 A | 3/1992 | Henegar et al. | |
| 5,385,036 A | 1/1995 | Spillane et al. | |
| 5,410,765 A | 5/1995 | Youngblood | |
| 5,421,046 A | 6/1995 | Vande Streek | |
| 5,515,559 A | 5/1996 | Benson | |
| 5,517,707 A | 5/1996 | LaMantia | |
| 5,566,407 A | 10/1996 | Lien | |
| 5,575,025 A | 11/1996 | Peters | |
| 5,577,276 A | 11/1996 | Nicholson et al. | |
| 5,642,545 A | 7/1997 | Howard | |
| 5,699,571 A | 12/1997 | Yowell | |
| 5,706,534 A | 1/1998 | Sherman | |
| 5,787,534 A | 8/1998 | Hargest et al. | |
| 5,806,112 A | 9/1998 | Harms | |
| 5,855,031 A | 1/1999 | Swift, Jr. | |
| 5,857,232 A | 1/1999 | Mahdavi | |
| 5,870,785 A | 2/1999 | Hoorens | |
| 5,881,408 A | 3/1999 | Bashista et al. | |
| 5,897,164 A | 4/1999 | Kagan et al. | |
| 5,933,885 A | 8/1999 | Glassford | |
| 5,937,458 A | 8/1999 | DeRosa | |
| 5,950,264 A | 9/1999 | Wyner et al. | |
| 6,012,189 A | 1/2000 | Dudley | |
| 6,017,601 A | 1/2000 | Keller et al. | |
| 6,019,421 A | 2/2000 | Roh | |
| 6,039,393 A | 3/2000 | Roh | |
| 6,055,690 A | 5/2000 | Koenig | |
| 6,089,947 A | 7/2000 | Green | |
| D433,851 S | 11/2000 | Roh | |
| 6,168,495 B1 | 1/2001 | Yoon | |
| 6,170,101 B1 | 1/2001 | McCloud | |
| 6,174,584 B1 | 1/2001 | Keller et al. | |
| 6,178,573 B1 | 1/2001 | Wagner et al. | |
| 6,243,895 B1 | 6/2001 | Amin | |
| D444,329 S | 7/2001 | Newman | |
| 6,256,813 B1 | 7/2001 | Aaron | |
| 6,263,529 B1 | 7/2001 | Chadwick et al. | |
| 6,302,487 B1 | 10/2001 | Fujita et al. | |
| 6,315,364 B1 | 11/2001 | Fujita et al. | |
| 6,347,422 B2 | 2/2002 | Heavrin | |
| 6,421,857 B2 | 7/2002 | Whatman et al. | |
| 6,438,775 B1 | 8/2002 | Koenig | |
| 6,489,000 B1 | 12/2002 | Ogura et al. | |
| 6,550,083 B1 | 4/2003 | LaMantia | |
| 6,618,880 B1 | 9/2003 | Chase | |
| 6,670,018 B2 | 12/2003 | Fujita et al. | |
| 6,684,437 B2 | 2/2004 | Koenig | |
| 6,718,577 B2 | 4/2004 | Li | |
| 6,718,578 B2 | 4/2004 | Li | |
| 6,772,457 B1 | 8/2004 | Alaback | |
| 6,859,958 B2 | 3/2005 | LaMantia | |
| 6,859,962 B2 | 3/2005 | Diak/Ghanem | |
| 6,910,896 B1 | 6/2005 | Owens et al. | |
| 6,934,985 B2 | 8/2005 | Sanders | |
| D510,217 S * | 10/2005 | Neveau ........................ | D6/596 |
| 6,971,130 B2 | 12/2005 | Chase | |
| 7,003,823 B1 | 2/2006 | Reed et al. | |
| 7,007,325 B1 | 3/2006 | Gomeh | |
| 7,055,192 B2 | 6/2006 | Waters et al. | |
| 7,107,638 B2 | 9/2006 | Wilson | |
| 7,181,797 B2 | 2/2007 | Chase | |
| 7,523,513 B2 | 4/2009 | Waters | |
| 7,743,442 B2 | 6/2010 | Maloney et al. | |
| 7,793,368 B2 | 9/2010 | Burrell, IV | |
| 8,069,496 B2 | 12/2011 | Sesselmann | |
| 8,161,584 B1 | 4/2012 | Del Rio | |
| 8,220,088 B2 | 7/2012 | Waters et al. | |
| 8,365,323 B2 | 2/2013 | Crumrine | |
| 8,434,179 B2 | 5/2013 | Reeves et al. | |
| 8,539,626 B2 | 9/2013 | Dunne et al. | |
| 8,590,081 B1 | 11/2013 | Dunne et al. | |
| 8,646,128 B2 | 2/2014 | Kaplan et al. | |
| 8,661,581 B2 | 3/2014 | Kaplan et al. | |
| 8,689,379 B2 | 4/2014 | Cicci | |
| 8,793,813 B2 * | 8/2014 | Waters ................... | A41B 13/06 2/69 |
| 9,038,222 B2 * | 5/2015 | Cicci .................... | A47D 15/008 5/663 |
| 2001/0000362 A1 | 4/2001 | Wagner et al. | |
| 2001/0037526 A1 | 11/2001 | Whatman et al. | |
| 2002/0034901 A1 | 3/2002 | Fujita et al. | |
| 2002/0178500 A1 | 12/2002 | Koenig | |
| 2003/0028964 A1 | 2/2003 | Li | |
| 2003/0177576 A1 | 9/2003 | LaMantia | |
| 2004/0049850 A1 | 3/2004 | Li | |
| 2004/0088790 A1 | 5/2004 | Chase | |
| 2004/0128764 A1 | 7/2004 | McGrath et al. | |
| 2004/0154099 A1 | 8/2004 | Waters et al. | |
| 2004/0199999 A1 | 10/2004 | Landry | |
| 2004/0231055 A1 | 11/2004 | Sanders | |
| 2005/0039262 A1 | 2/2005 | Chase | |
| 2005/0132498 A1 | 6/2005 | Vrionis | |
| 2005/0177942 A1 | 8/2005 | Finn | |
| 2005/0217030 A1 | 10/2005 | Seigler | |
| 2006/0010608 A1 | 1/2006 | DeFranks et al. | |
| 2006/0130235 A1 | 6/2006 | Wilson | |
| 2006/0218726 A1 | 10/2006 | Waters et al. | |
| 2009/0313755 A1 | 12/2009 | Burrell, VI | |
| 2010/0107338 A1 | 5/2010 | Waters et al. | |
| 2010/0154119 A1 | 6/2010 | Shuttleworth | |
| 2010/0223726 A1 | 9/2010 | Maloney | |
| 2010/0257654 A1 | 10/2010 | Waters et al. | |

(56) References Cited

U.S. PATENT DOCUMENTS

| | | | |
|---|---|---|---|
| 2010/0319122 A1 | 12/2010 | Crumrine | |
| 2011/0041247 A1 | 2/2011 | Moon | |
| 2011/0113552 A1* | 5/2011 | Miller | A47D 15/008 5/424 |
| 2011/0220102 A1 | 9/2011 | Waters et al. | |
| 2012/0005829 A1 | 1/2012 | Waters et al. | |
| 2012/0005831 A1 | 1/2012 | Waters et al. | |
| 2012/0005833 A1 | 1/2012 | Waters et al. | |
| 2012/0009844 A1 | 1/2012 | Waters et al. | |
| 2012/0030879 A1 | 2/2012 | Waters et al. | |
| 2012/0180215 A1 | 7/2012 | Waters et al. | |
| 2012/0180786 A1 | 7/2012 | Waters et al. | |
| 2012/0241483 A1 | 9/2012 | Waters et al. | |
| 2012/0278995 A1 | 11/2012 | Kaplan et al. | |
| 2012/0311792 A1 | 12/2012 | Reeves et al. | |
| 2012/0317721 A1 | 12/2012 | Dunne et al. | |
| 2013/0097784 A1 | 4/2013 | Kaplan et al. | |
| 2013/0097785 A1 | 4/2013 | Cicci | |
| 2013/0174315 A1 | 7/2013 | Slank | |
| 2013/0333112 A1 | 12/2013 | Dunne et al. | |
| 2014/0096320 A1 | 4/2014 | Wilson | |
| 2014/0157520 A1* | 6/2014 | Cicci | A47D 15/008 5/663 |
| 2014/0338402 A1* | 11/2014 | Waters | A41B 13/06 66/171 |
| 2015/0335172 A1* | 11/2015 | Waters | A47D 7/00 5/424 |

FOREIGN PATENT DOCUMENTS

| | | |
|---|---|---|
| WO | WO 99/56588 | 11/1999 |
| WO | WO 2004/056237 A2 | 7/2004 |

OTHER PUBLICATIONS

"Baby Carrier Air" datasheet [online]. Babybjorn AB, Danderyd, Sweden, [retrieved on Nov. 3, 2006], Retrieved from the Internet: <URL:http//www.babyjorn.com/TemplatesWeb/ProductDetails.asp?ItemId=2284>; 1 page.

"Cozy Crib Tent" magazine advertisement. Tots in Mind, Inc., Salem, NH; 1 page.

"High-Tech Toy Testing Equipment" datasheet [online]. U.S. Consumer Product Safety Commission [retrieved on Feb. 15, 2007], Retrieved from the Internet: URL:http://www.cpsc.gov/cpscput/prerel/prhtm101/0155.html; 2 pgs.

"Virtual Child Model" datasheet [online], Nemours, Jacksonville, FL, [retrieved on Feb. 15, 2007]. Retrieved from the Internet: URL:http//nemours.org/internet?url=no/news/releases/2000/001212_unsafe_toys.html; 2 pgs.

Safe-N-Secure Crib Liner, 1998 Show Directory, The 29th Annual International Juvenile Products Show, Oct. 25-28, 1998 (Dallas, Texas).

Cribble™ Crib Slat Safety Wraps, The 1999 International Juvenile Products Show Directory Oct. 23-26, 1999 (Dallas, Texas).

Safe-N-Secure Crib Liner, BBABY233-40.

Defendant's Prior Art Chart from Prior Art Statement in *BreathableBaby, LLC* v. *Crown Crafts, Inc.* and *Crown Crafts Infant Products, Inc.*; Civil Case No. 12-cv-00094 (PJS/TNL) before the United States District Court, District of Minnesota.

Plaintiff's Response to Prior Art Statement in *BreathableBaby, LLC* v. *Crown Crafts, Inc.* and *Crown Crafts Infant Products, Inc.*, Civil Case No. 12-cv-00094 (PJS/TNL) before the United States District Court, District of Minnesota.

* cited by examiner

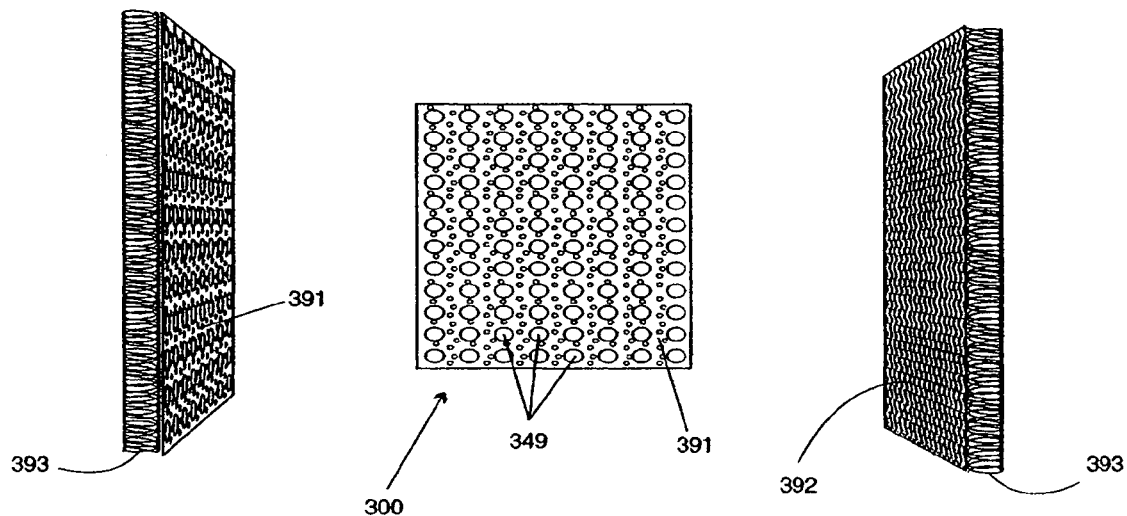
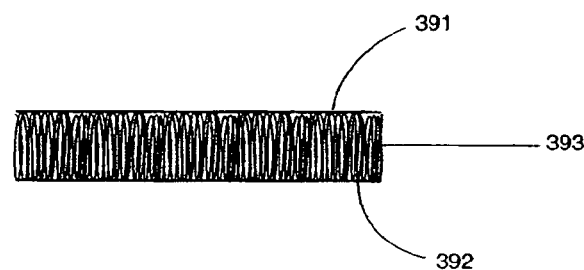
FIG. 2F

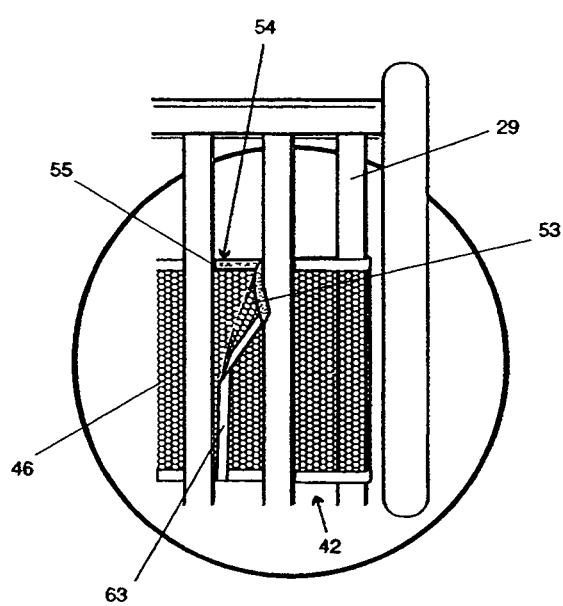
FIG. 3A
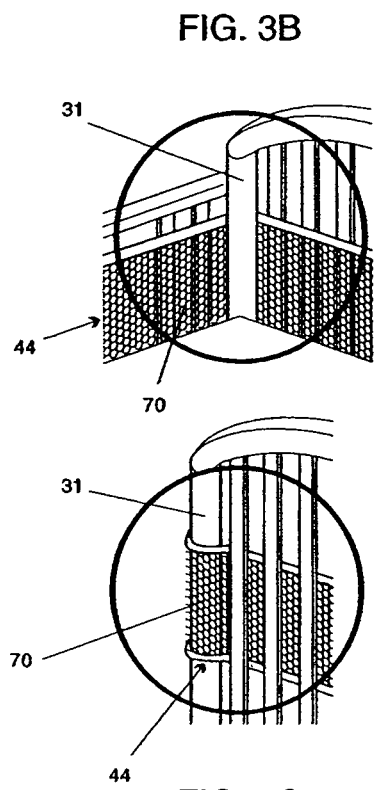
FIG. 3B
FIG. 3C

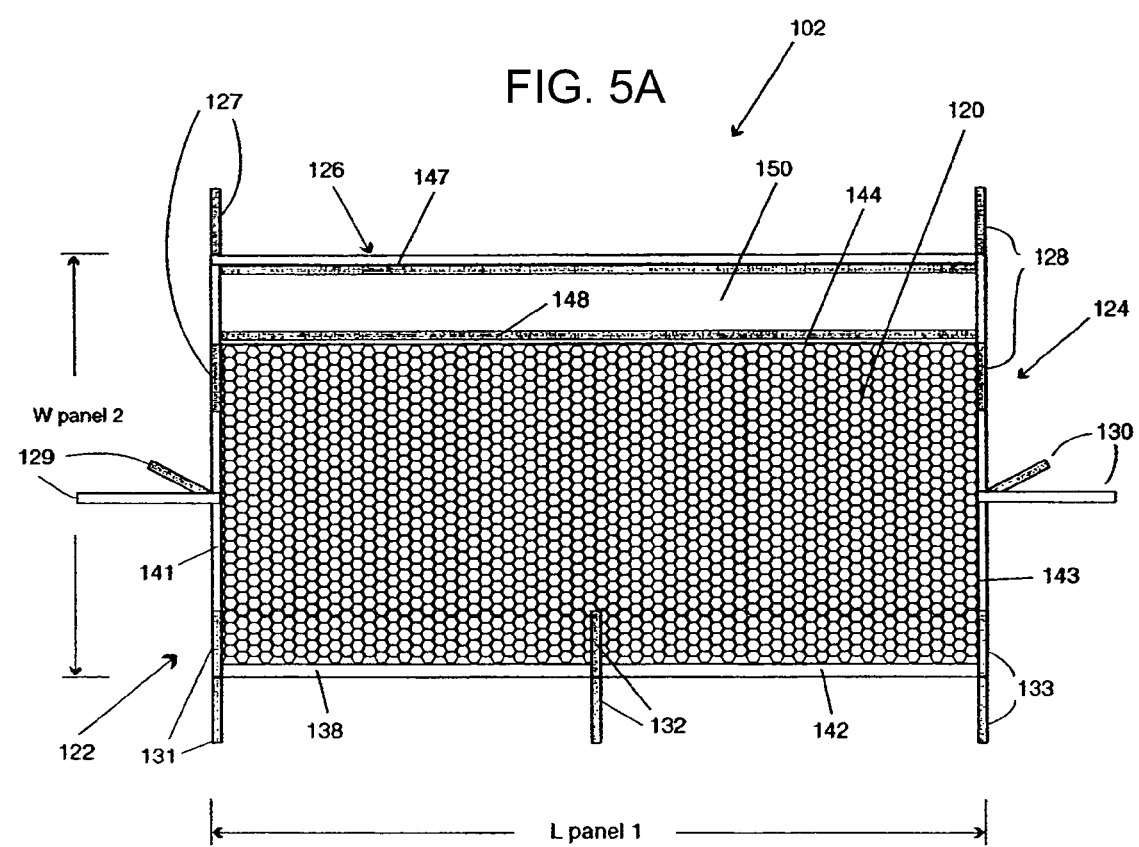

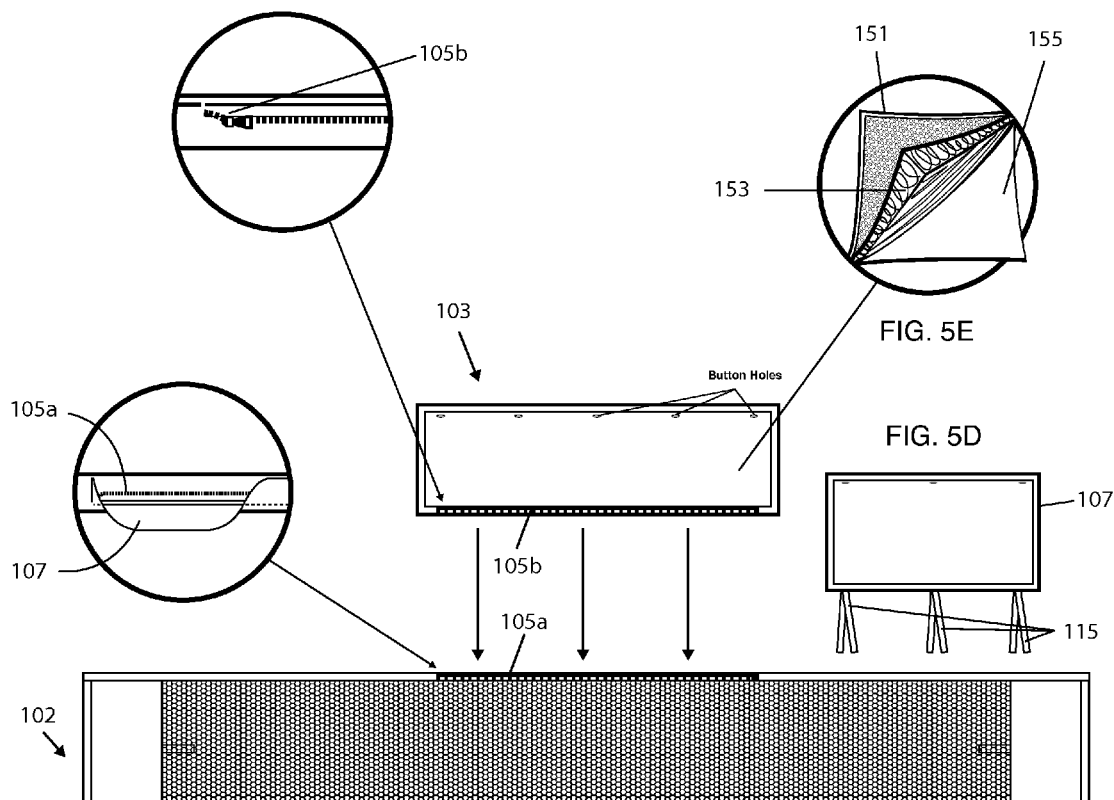
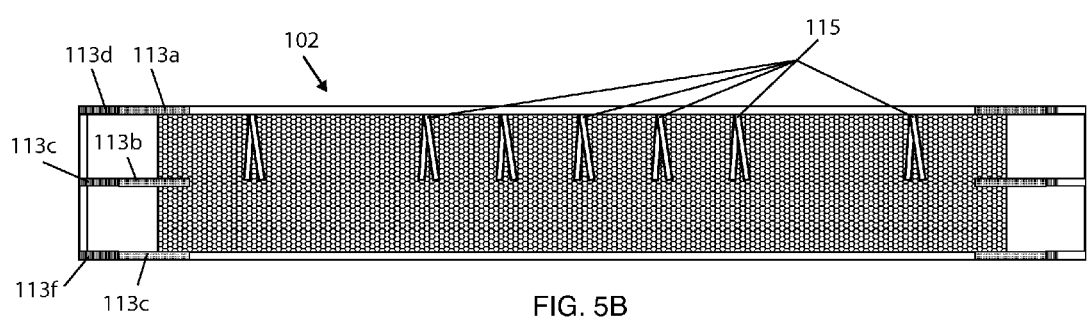

252

↑
250

A. Crib Slat Pads with liner
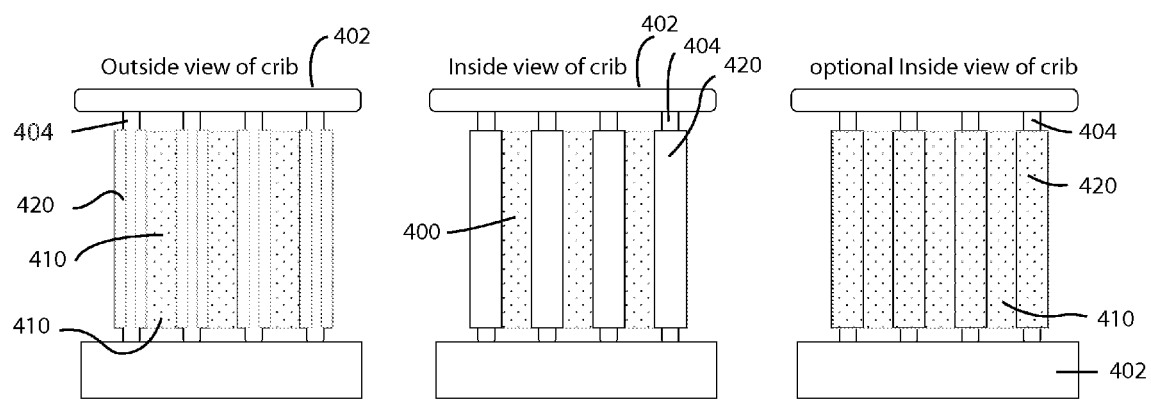
FIG. 16A  FIG. 16B  FIG. 16C
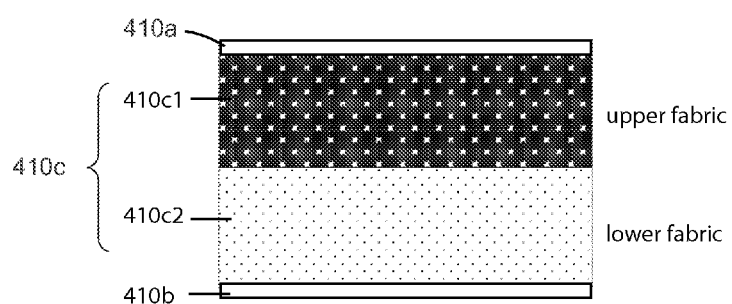
FIG. 17

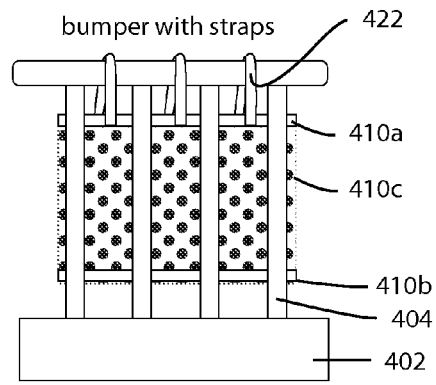
FIG. 18
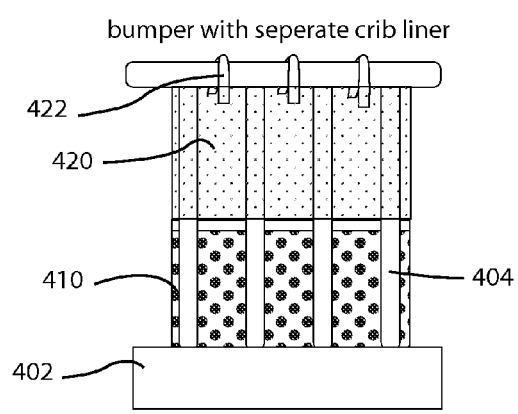 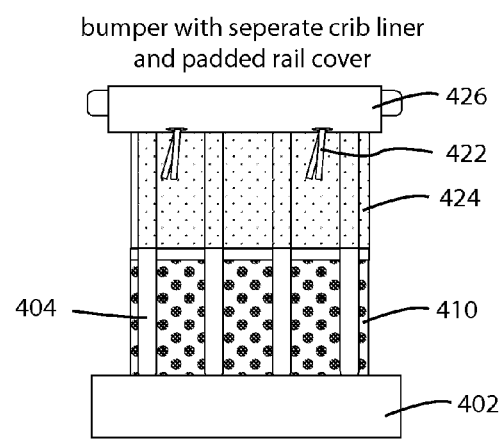
FIG. 19A  FIG. 19B

CRIB SHIELD SYSTEM AND OTHER BREATHABLE APPARATUS

CROSS-REFERENCE TO RELATED APPLICATIONS

This application is a Continuation-in-Part of U.S. patent application Ser. No. 12/429,734, filed on Apr. 24, 2009, entitled "Crib Shield System and Other Breathable Apparatus," which is a Divisional of U.S. patent application Ser. No. 11/446,017, filed Apr. 28, 2009, U.S. Pat. No. 7,523,513 to be issued on Apr. 28, 2009, entitled "Crib Shield System and Other Breathable Apparatus", which is a Continuation of U.S. patent application Ser. No. 10/738,616, filed Dec. 16, 2003, now U.S. Pat. No. 7,055,192 issued Jun. 6, 2006, which claims the priority date of U.S. Provisional Patent Application No. 60/773,910, filed Feb. 16, 2006. The disclosures both of which are incorporated by reference herein.

BACKGROUND OF THE INVENTION

The present invention relates to cribs and other usable objects (e.g., child usable objects). More particularly, the present invention pertains to crib attachments and other breathable apparatus that, for example, protect infants or young children from harm, e.g., crib attachments that prevent or protect infants or young children when in a crib from getting into one or more problematic situations, e.g., getting limbs extended and caught between crib slats or chewing on crib rails, siblings poking sharp objects into the crib, etc.

For example, conventional baby cribs include side rails that are made up of top and bottom horizontal bars interconnected by a series of spaced supports (e.g., vertical slats). Frequently, babies and toddlers, while sleeping or playing in their cribs, intentionally or accidentally extend their limbs out of the crib between the slats and have difficulty drawing them back into the crib. If this occurs when the child is sleeping, the extended limbs will remain uncovered and become cold, and the child will be ultimately awakened. Many cribs also have headboards and footboards that are also made with spaced-apart supports and the baby may also extend its arms or legs out of the crib between these slats.

Although various types of apparatus have been used to prevent such problematic situations (e.g., extension of limbs outside of the crib through the spaced-apart supports), many of such apparatus exhibit their own problems. For example, as described herein, ventilation may be problematic (e.g., such as that leading up to and resulting in suffocation). For example, crib bumper pads are widely used in cribs for protecting a child from injury caused by bodily impact of the child against the sides of the crib that define the interior boundary of the crib. However, in many cases, such crib bumpers do not allow for adequate ventilation within the crib and obstruct view of the child.

Infants usually breathe through the nasal passages. However, during crying or in the event their nasal passages are blocked, infants may breathe through their oral cavities. Mechanical resistance suffocation takes places when respiration is interrupted if these passages are both blocked externally by an object. When respiration is interrupted, $CO_2$ levels in the blood rise. The body's response to this elevation in $CO_2$ levels is to attempt more rigorous respiration. If the agent of suffocation is not removed, the incident may be fatal after two or three minutes. Further, the accumulation of $CO_2$ or other dangerous gases inside the crib may be a possible cause of sudden infant death syndrome (SIDS). Existing crib apparatus, such as crib bumper pads, tend to trap dangerous gases inside the crib. Further, such apparatus may block the passages of infants under certain circumstances.

Various types of other crib apparatus have been described and attempt to reduce one or more of the above problems. For example, such apparatus are described in U.S. Pat. No. 5,881,408 to Bashista et al., entitled "Mesh Crib Liner," issued 16 Mar. 1999; and U.S. Pat. No. 6,178,573 to Wagner et al., entitled "Ventilation Upgrade Kit for a Crib Bumper and Method of Using It."

SUMMARY OF THE INVENTION

The present invention, as described herein, addresses the problems described above and other problems of prior art systems and methods which will become apparent to one skilled in the art from the description below. Generally, the present invention provides a crib shield system that is breathable, as well as other breathable apparatus (e.g., objects such as blankets, toys, etc.). For example, one crib shield system is for use with a crib that includes a first and second side rail, a headboard, and a footboard connected and sized for receiving a mattress therein. At least one of the first and second side rails includes a top bar and a plurality of spaced support elements.

The crib shield system according to the present invention for use with the crib includes a first and second side panel, wherein each of the first and second side panels is configured as a separate panel to cover at least a substantial portion of a corresponding side rail with a mesh-type material comprising openings too small to permit an infant to insert a finger or toe therethrough. Each of the first and second side panels includes at least one fastening apparatus that extends along an entire edge of the side panel to attach the side panel to the top bar of a corresponding side rail. Further, each of the first and second side panels includes at least one other fastening apparatus for securing the side panel to the corresponding side rail.

In one embodiment of the crib shield system, the system further includes at least one of a first and second end panel. Each of the at least one first and second end panels is configured as a separate panel to cover at least a substantial portion of a corresponding headboard or footboard with a mesh-type material having openings too small to permit an infant to insert a finger or toe therethrough. Each of the first and second end panels includes at least one fastening apparatus that extends along an entire edge of the panel to attach the panel to a spaced support element of a corresponding headboard or footboard, and further wherein each of the first and second end panels includes at least one other fastening apparatus for securing the panel to the corresponding headboard or footboard.

In yet another embodiment, the at least one other fastening apparatus of each of the first and second end panels is provided at one or more positions along an edge opposite the entire edge to allow a user to pull the panel taut across the corresponding headboard or footboard when the at least one fastening apparatus extending along the entire edge of the panel is attached to the spaced support element of the corresponding headboard or footboard. Further, it is configured to secure the panel to another spaced support element of the corresponding headboard or footboard using the at least one other fastening apparatus.

In yet another embodiment of the system, the at least one other fastening apparatus of each of the first and second side panels is provided at one or more positions along an edge opposite the entire edge to allow a user to pull the panel taut across the corresponding side rail when the at least one fastening apparatus extending along the entire edge of the panel is attached to the top rail of a corresponding side rail. Further, it is configured to secure the panel to another portion of the corresponding side rail using the at least one other fastening apparatus.

Another crib shield system according to the present invention for use with a crib (e.g., wherein each of the first and second side rails extend along a length of the crib between the headboard and the footboard) includes a first panel and a second panel. The first panel is configured to cover at least a portion of the first side rail and to extend along substantially the length of the crib. Further, the first panel is formed substantially of a mesh-type material having openings too small to permit an infant to insert a finger or toe therethrough and includes at least one fastening apparatus to attach a first end of the first panel to a first portion of the first side rail. Yet further, the first panel includes at least one other fastening apparatus for securing a second end opposite of the first end of the first panel to a second portion of the first side rail.

The second panel is separate from the first panel and is configured to cover at least a portion of the second side rail and to extend at least along the length of the crib. The second panel is substantially formed of a mesh-type material having openings too small to permit an infant to insert a finger or toe therethrough and the second panel includes at least one fastening apparatus to attach a first end of the second panel to the crib. Further, the second panel includes at least one other fastening apparatus for securing a second end opposite of the first end of the second panel to the crib.

In one embodiment of this crib shield system, the second panel is further configured to cover at least a portion of the headboard and footboard, the at least one fastening apparatus of the second panel is configured to attach the second panel to one of the headboard and footboard, and the at least one other fastening apparatus of the second panel is configured to secure the second panel to the other of the headboard and footboard.

In another embodiment of the system, the at least one fastening apparatus of the second panel is configured to attach the second panel to a spaced support element that forms a part of the headboard, and the at least one other fastening apparatus of the second panel is configured to attach the second panel to another spaced support element that forms a part of the footboard.

Yet further, in another embodiment, the at least one fastening apparatus of the first panel is configured to attach the first end of the first panel to a spaced support element of the first side rail proximate the headboard, and the at least one other fastening apparatus of the first panel is configured to attached the second end of the first panel to another spaced support element of the first side rail proximate the footboard.

Further, in one or more embodiments of this crib shield system, at least the first panel includes a width that is less than the length of a spaced support element of the first side rail or a width that is less than one half the length of a spaced support element of the first side rail.

Another crib shield system for a crib that includes a plurality of spaced support elements (e.g., used in defining an interior boundary extending proximate and around a periphery of a mattress disposed within the crib) includes at least one panel configured to cover at least a portion of the plurality of spaced support elements and to extend along at least a portion of the interior boundary. The at least one panel is formed substantially of a breathable integrated padded mesh material and includes at least one fastening apparatus for securing the at least one panel to the crib.

In one embodiment of this system, the at least one panel may include a first panel and a second panel. The first panel is sized to cover at least a portion of the plurality of spaced support elements that form a part of a first side rail that defines at least a part of the interior boundary and to extend along a substantial portion of a length of the first side rail from a headboard to a footboard of the crib. Further, the first panel includes at least one fastening apparatus to attach a first end of the first panel to one of the plurality of spaced support elements of the first side rail, and also at least one other fastening apparatus for securing a second end of the first panel to another one of the plurality of spaced support elements of the first side rail. The second panel is separate from the first panel and is sized to cover at least a portion of the plurality of spaced support elements that form a part of a second side rail that defines at least a part of the interior boundary and to extend at least along a substantial portion of a length of the second side rail from a headboard to a footboard of the crib. The second panel includes at least one fastening apparatus to attach the second panel to one of the plurality of spaced support elements of the crib, and also includes at least one other fastening apparatus for securing the second panel to another one of the plurality of spaced support elements of the crib.

In yet another embodiment of the system, the second panel is further sized to cover at least a portion of the headboard and the footboard that defines at least a part of the interior boundary. For example, the at least one fastening apparatus of the second panel is configured to attach the second panel to a spaced support element of the headboard and the at least one other fastening apparatus of the second panel is configured to secure the second panel to a spaced support element of the footboard.

In one or more embodiments of the apparatus or systems described herein, the plurality of spaced support elements covered, at least in part, by the at least one panel form a part of a side rail that is movable relative to a remainder of the crib. Further, one or more of the fastening apparatus may include a hook and loop fastener.

Further, one or more of the panels of the systems described herein may be formed of a breathable integrated padded mesh material. For example, the mesh-type material may include a front substructure, a back substructure, and a pile substructure integrated with and extending between the front and back substructures. Each of the substructures allows air to substantially move effectively therethrough.

Yet further according to the present invention, various other breathable apparatus may be provided. For example, an apparatus may include a body portion that includes one or more surfaces. The body portion is, for example, used proximate the mouth of a human being. The body portion may form at least a substantial portion of at least one of a blanket, a baby carrier apparatus, baby clothing, a toy, etc. Further, substantially all of the one or more surfaces of the body portion may be formed of a breathable integrated padded mesh material.

According to one embodiment, an apparatus includes a single layer fabric mesh having a length proportional to the circumference of a crib, the single layer fabric mesh allowing air flow through the single layer fabric mesh. The apparatus also includes a top liner attached to a first long side of the single fabric layer mesh. The apparatus further includes a bottom liner attached to a second long side, opposing the first long side, of the single fabric layer mesh.

According to another embodiment, a method includes weaving a crib bumper between slats of a crib. The method also includes attaching the crib bumper to the crib with a fastener.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

BRIEF DESCRIPTION OF THE DRAWINGS

FIGS. 2C-2F show details of one embodiment of an integrated padded mesh material that may be used in forming the side panels and the crib shield system shown in FIGS. 1 and 2, as well as other apparatus or objects described in the other figures.

FIGS. 3A-3C illustrate the attachment of the first and second side panels shown in FIGS. 1 and 2 to a crib according to one embodiment of the present invention.

FIG. 5A shows a top view of one embodiment of a side panel for use in the full crib shield system shown in FIG. 4A according to the present invention in an unattached position laid flat.

FIG. 5B shows a back side of a crib shield mesh according to the present invention.

FIG. 5C shows a front side and several magnified views of a side panel for use in a crib shield system according to the present invention.

FIG. 5D shows a side view of a second crib rail cover.

FIG. 5E is an illustration of a rail cover having multiple layers of fabric.

FIGS. 16A-C show an illustration of various embodiments of a crib liner with crib slat pads according to the present invention.

FIG. 17 shows an illustration of a two-part bumper system of one embodiment according to the present invention.

FIG. 18 shows an illustration of a crib liner with attachment devices of one embodiment according to the present invention.

FIGS. 19A-B show an illustration of one embodiment of a crib liner with extended length according to the present invention.

DETAILED DESCRIPTION OF THE EMBODIMENTS

One or more embodiments of crib shield systems shall be described with reference to FIGS. 1-8. Thereafter, various embodiments of other breathable apparatus shall be described with further reference to FIGS. 9-13. Additional embodiments of a crib shield system shall be described with further reference to FIGS. 14-21.

Figure 1A:
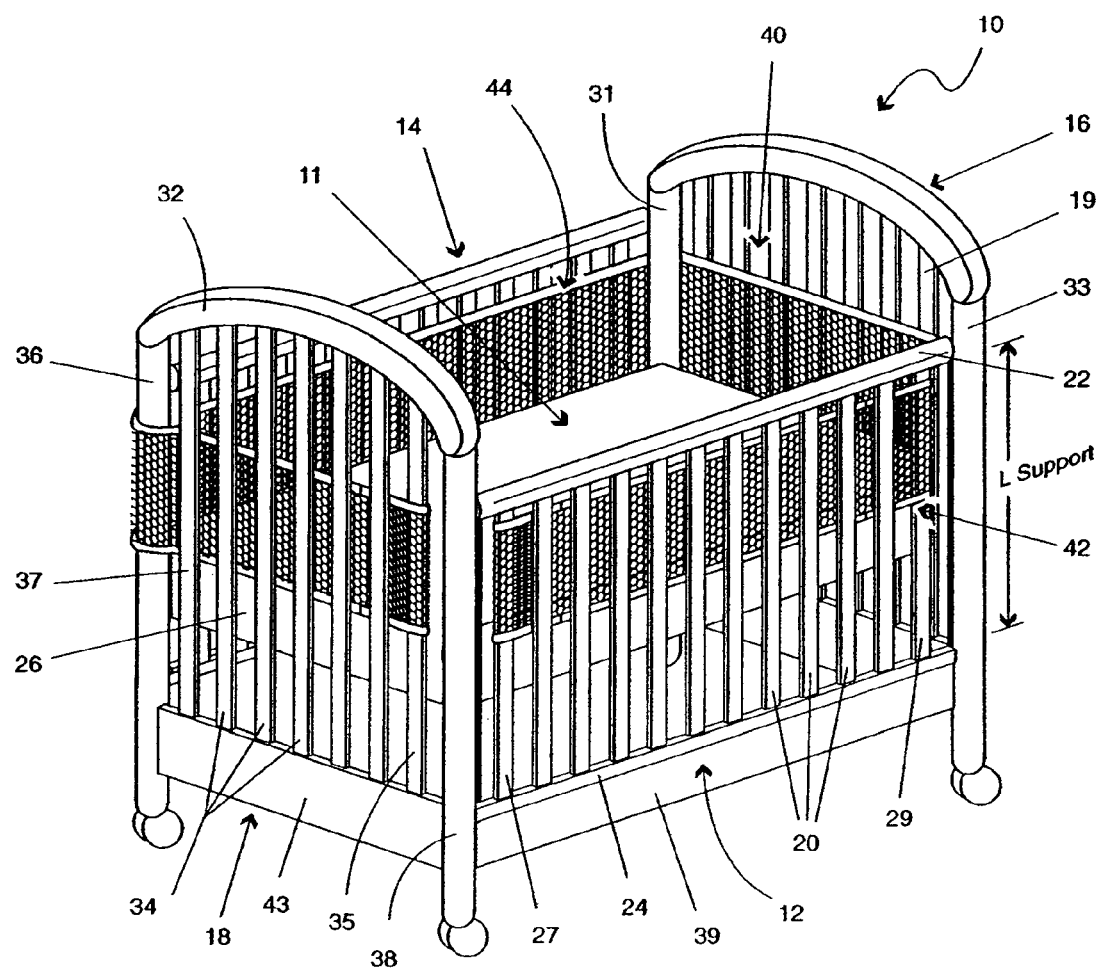
FIG. 1A shows a perspective view of one embodiment of a low crib shield system attached to a crib with a side rail of the crib in a raised state.

FIG. 1A shows a conventional crib 10. The crib 10 includes two side rails 12, 14, a footboard 16, and a headboard 18. The side rails 12, 14 extend between the footboard 16 and headboard 18 along a length thereof. The headboard 18, footboard 16, and side rails 12, 14 are connected and sized for receiving a mattress within an interior 11 of the crib 10.

Figure 4A:
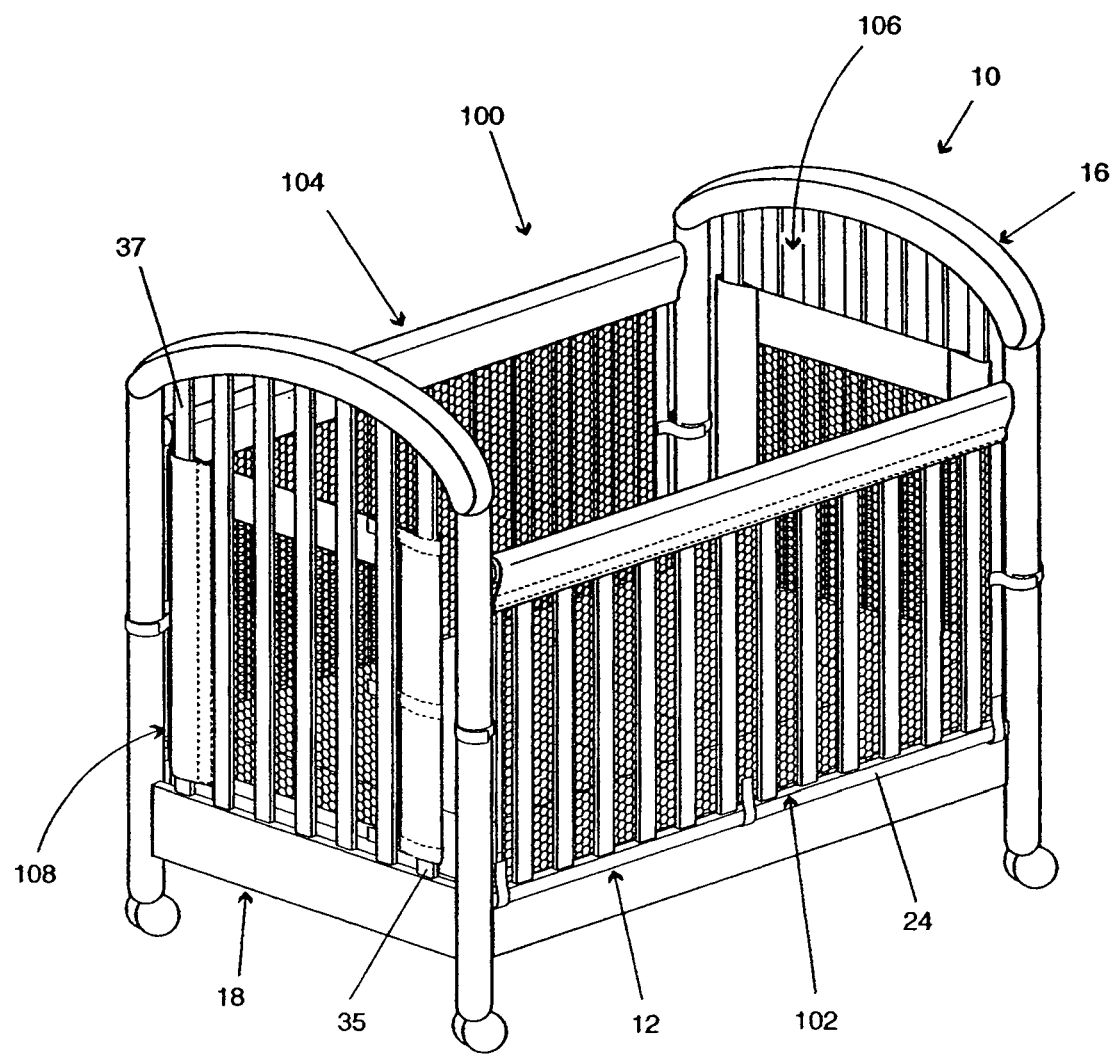
FIG. 4A shows a perspective view of one embodiment of a full crib shield system attached to a crib with the mattress of the crib in a lowered position and a moveable side rail in a raised state.

Generally, the side rails 12, 14, footboard 16, and headboard 18 define an interior boundary extending proximate and around a periphery of the mattress 26 disposed within the crib 10. The mattress 26 is supported within the crib 10 by various structure not shown in FIG. 1A. For example, a bottom structural member may be supported at one or more positions about the interior boundary of the crib 10 (e.g., elements attached to corner posts 36, 38, 31, 33) or in any other fashion. In many conventional cribs 10, the mattress 26 and/or a supporting member therebelow may be raised and/or lowered. For example, as shown in FIG. 1A, the mattress 26 is in a raised state. On the other hand, as shown in FIG. 4A (to be described further herein), the mattress is shown in a lowered state. The lowered state is closer to the ground or floor upon which the crib 10 is positioned than the raised state.

The side rail 12 generally includes a top bar 22 and a bottom bar 24 positioned substantially parallel to one another. A plurality of generally vertically-spaced side support elements 20 extend between the horizontal top bar 22 and horizontal bottom bar 24. The side rail 12 in many conventional cribs is moveable from a raised state to a lowered state. For example, the moveable side rail 12 allows a user to lower the side rail 12 in order to have easier access to a child lying on mattress 26. As shown in FIG. 1A, side rail 12 can be raised or lowered relative to support structure element 39 and the remainder of the crib 10. The present invention allows for the side rail 12 to be moved from a lowered state to a raised state, or vice versa, even with the crib shield system 40 attached to the crib 10.

Side rail 14 may be similarly configured like that of side rail 12. In other words, side rail 14 may be moveable from a lowered to a raised state, and vice versa. However, side rail 14 may also be in a stationary position fixedly attached to corner posts 36, 31. Likewise, side rail 12 may be moveable or in a fixed position. As moveable side rails are conventional configurations, no further description is provided with respect to the mechanisms for allowing such movement thereof. The crib shield systems described herein work with various mechanisms for moving side rails, e.g., side and bottom latch systems and gliding side mechanisms.

Headboard 18 of crib 10 includes an upper bar 32 (e.g., in a decorative curved shape) as well as a bottom horizontal element 43, each connected in a fixed position to corner posts 36, 38. In a similar manner to the side rails 12, 14, generally vertically-spaced support elements 34 extend between the top bar 32 and the horizontal element 43. It will be recognized that many cribs may or may not have spaced support elements that define a part of the footboard 16 or headboard 18. For example, the headboard and footboard may be solid materials as opposed to spaced-apart supports. The footboard 16 is configured in a manner like that of headboard 18 and includes corner posts 31, 33.

As shown in FIG. 1A, the plurality of spaced-apart side support elements 20, 34 of the side rails 12, 14 and the headboard and footboard 16, 18 are used to define the interior boundary extending proximate and around the periphery of the mattress 26 disposed within the crib 10. In one embodiment, and as shown in FIG. 1A, at least one panel is sized for covering at least a portion of the plurality of spaced-apart side support elements and configured to extend along at least a portion of the interior boundary. As is described herein, in one preferred embodiment, substantially the entire panel is formed of a breathable integrated padded mesh material and the panel includes at least one fastening apparatus for securing at least one panel to the crib 10.

As used herein, the term mattress may include any structure disposed within crib 10 and upon which objects and/or human beings may be placed. In other words, mattress refers to any structure and not just a soft sleeping apparatus. For example, the crib could be configured into a playpen-type structure with a solid hard and/or flat bottom that is, for example, lowered very close to the floor. As such, and as used herein, a crib can be equated to and encompasses the various structures similar to a crib, such as those for containing a small child (e.g., playpens, portable cribs, convertible cribs, round cribs, or other structures including, for example, spaced-apart side supports which require an apparatus or system such as that described herein).

As further shown in FIG. 1A, crib shield system 40 is attached to crib 10 along a substantial portion of the interior boundary of the crib 10 defined by the headboard 18, footboard 16, and side rails 12, 14. As shown in FIG. 1A, a first side panel 42 is attached to side rail 12. Further, a second side panel 44 is attached for covering side rail 14, footboard 16, and headboard 18. However, one skilled in the art will recognize that the second side panel 44 may also be configured to cover just the second side rail 14 and the footboard 16 (e.g., such as when the headboard 18 lacks vertical spaced-apart side support elements), or may cover just side rail 14 and headboard 18 (e.g., such as when footboard 16 lacks spaced-apart side support elements). In other words, the configuration of the second side panel 44 may differ depending upon the configuration of crib 10 upon which it is attached.

Figure 1B:
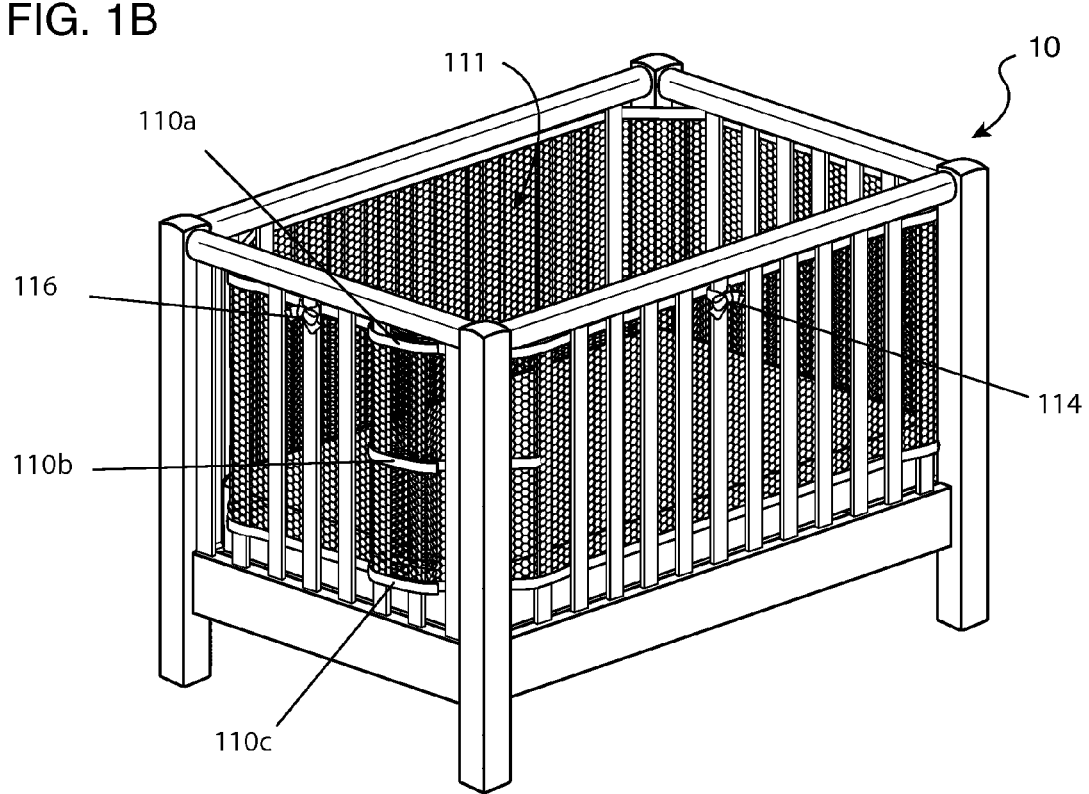
FIG. 1B shows a perspective view of one embodiment of a single-wrap crib shield system attached to a crib.

In another embodiment of the crib shield of FIG. 1A, the crib shield may extend nearly the full height of the crib. FIG. 1B shows a perspective view of one embodiment of a single-wrap crib shield system attached to a crib with a side rail of the crib in a raised state. A crib shield 111 may include wraps 110a, 110b, and 110c positioned at different vertical locations along the crib shield 111. The wraps 110a, 110b, and 110c may be Velcro, ties, snaps, and/or a zipper. The crib shield 111 may be fastened to the crib 10 through fasteners 114 and 116. The fasteners 114 and 116 may be located anywhere along the vertical height of the crib shield 111 or perimeter of the crib 10.

Figure 1C:
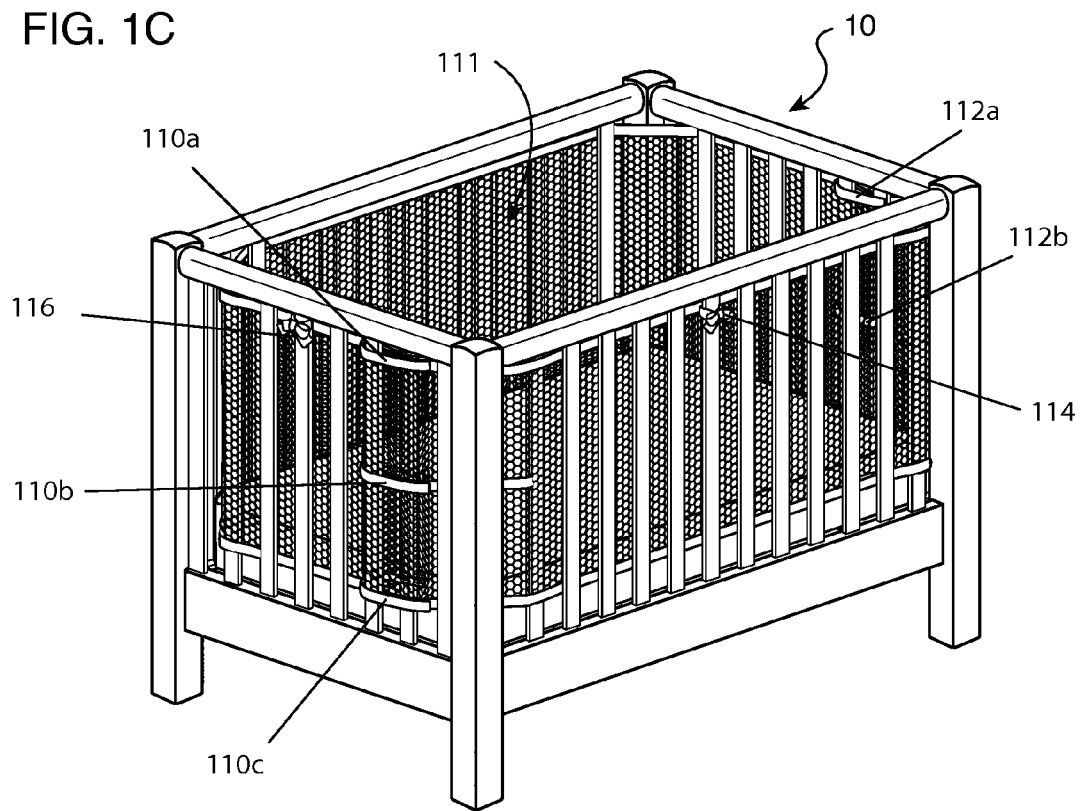
FIG. 1C shows a perspective view of one embodiment of a double-wrap crib shield system attached to a crib with a side rail of the crib in a raised state.

The crib shield of FIG. 1B illustrates a single wrap full height shield, but additional wraps may be used to secure the crib shield. FIG. 1C shows a perspective view of one embodiment of a double-wrap crib shield system attached to a crib with a side rail of the crib in a raised state. The crib shield 111 of FIG. 1C includes second wraps 112a and 112b located at different vertical heights along the crib shield 111.

Figure 1D:
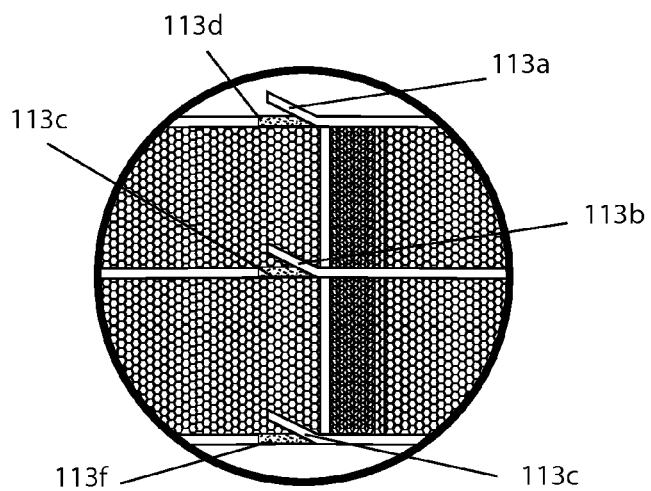
FIG. 1D shows a side view of one embodiment of a hook and loop velcro attachment.
Figure 1E:
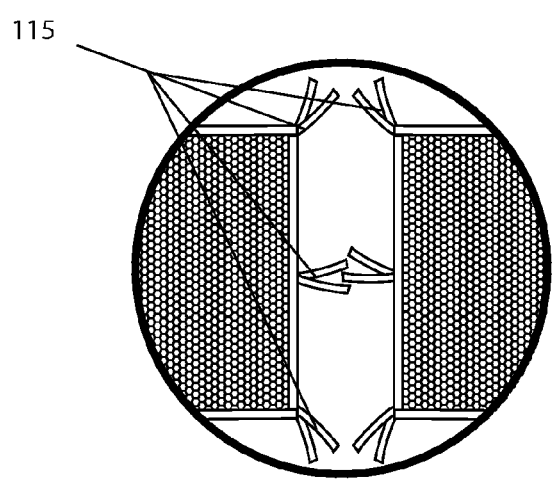
FIG. 1E shows a side view of one embodiment of tie attachments.
Figure 1F:
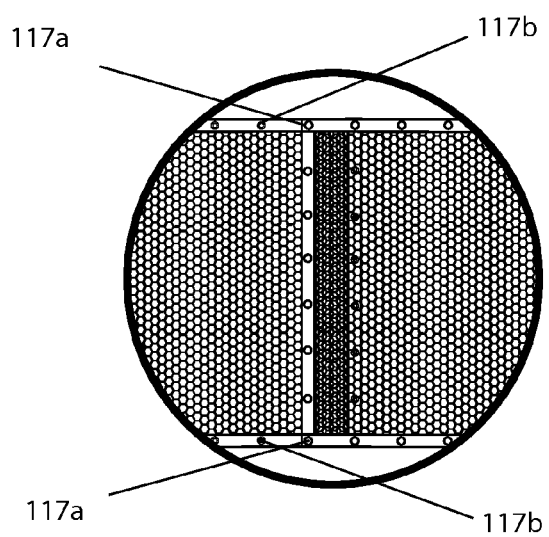
FIG. 1F shows a side view of one embodiment of snap attachments.

The various wrap types are illustrated in FIGS. 1D-1F. FIG. 1D shows a side view of one embodiment of a hook and loop Velcro attachment. Velcro 113a, 113b, and 113c located at different vertical positions may attach to Velcro receptors 113d, 113e, and 113f, respectively. FIG. 1E shows a side view of one embodiment of tie attachments. Ties 115 may be loose pieces of string located on ends of the crib shield or locations along the perimeter of the crib shield to allow an individual to tie one of the ties to another tie. FIG. 1F shows a side view of one embodiment of snap attachments. One side of the crib shield may include snap receptors 117b while another side of the crib shield may include snap attachments 117a. An individual snaps on the of the snap receptors 117b to a snap attachment 117a to secure the crib shield. A crib shield with snap attachments 117a and 117b allows an individual to custom size the crib shield by selecting where to couple a snap attachment to a snap receptor.

Figure 2A:
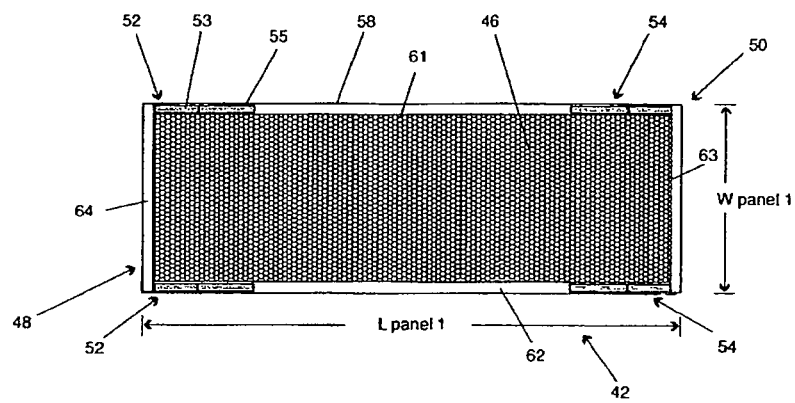
FIG. 2A is a top view of one embodiment of a first side panel of the low crib shield system shown in FIG. 1 in an unattached position laid flat.

FIG. 2A shows the first side panel 42 in an unattached laid flat position. The first side panel 42 includes a body 46 formed of a mesh-type material that extends along the length (L panel 1) from a first end 48 of the first side panel 42 to a second end 50 of the first side panel 42. The length (L panel 1) of the first side panel 42 is sized for allowing attachment to the side rail 12 of crib 10. For example, the length (L panel 1) is slightly longer than the distance between spaced-apart side support elements 27, 29. In such a manner, the first side panel 42 can be wrapped about such side support elements 27, 29 and fastened thereto using hook and loop closures 52, 54, as is further described herein with reference to FIG. 3A.

The body portion 46 has a width (W panel 1) that is less than a length (L support as shown in FIG. 1) of a vertical spaced support element 20 of the first side rail 12. Preferably, the width (W panel 1) is less than one-half the length (L support) of the vertical spaced side support element 20.

The first side panel 42 includes a first fastening apparatus 52 at the first end 48 of the first side panel 42 and a second fastening apparatus 54 at the second end 50 of the first side panel 42. Fastening apparatus 52 includes fastening portions 53, 55, such as hook and loop closures (e.g., Velcro). In one embodiment, fastening apparatus 54 is the same as fastening apparatus 52, however, such closure structures may also be different.

Various fastening apparatus may be used to attach the first side panel as well as the other panels as described herein to a crib. For example, various types of fastening apparatus may include hook and loop closures (e.g., Velcro), snaps, buttons/buttonholes, ties, straps, buckles, zippers, etc. Although hook and loop fasteners are preferable, any other closure or fastener apparatus suitable for attaching panels to crib 10 may be used.

In one embodiment, a finishing edge material 58 is provided along the periphery of the body portion 46. For example, as shown in FIG. 2A, a finishing edge material (e.g., a decorative material) may be used along edges 61-64.

Figure 2B:
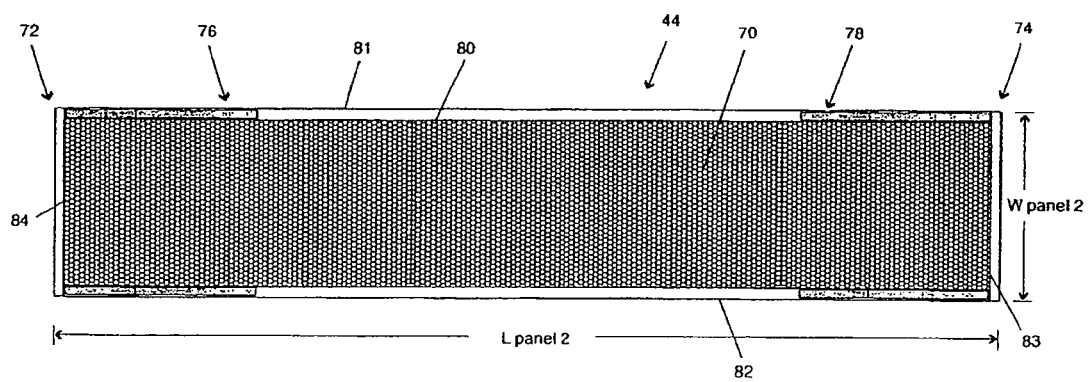
FIG. 2B is a top view of one embodiment of a second side panel of the low crib shield system shown in FIG. 1 in an unattached position laid flat.

FIG. 2B shows the second side panel 44 in an unattached laid flat position. The second side panel 44 includes a body portion 70 that extends along a length (L panel 2) from a first end 72 thereof to a second end 74 of the second side panel 44. The length (L panel 2) of the second side panel 44 is sized for allowing attachment to footboard 16 and headboard 18 and across side rail 14 of crib 10. For example, the length (L panel 2) is slightly longer than the combined lengths of the three sides of the crib 10 (i.e., the lengths of the footboard 16, headboard 18, and side rail 14). In such a manner, the second side panel 44 can be wrapped about support elements 19, 35 and fastened thereto using hook and loop closures 76, 78, as is further described herein. Further, the second side panel 44 has a width (W panel 2) that, at least in one embodiment, has substantially the same width as the width (W panel 1) of first panel 42.

Further, second side panel 44 includes fastening apparatus 76 at first end 72 of the second side panel 44 and fastening apparatus 78 at the second end 74 of the second panel 44. Such fastening apparatus 76, 78 are substantially similar to the hook and loop fasteners described with respect to first panel 42. Further, in a like manner, finishing edge material 80 may be used around the perimeter of the body portion 70 as shown by the finishing material 80 along edges 81-84.

The mesh-type material of the body portion 46 of first side panel 42 and body portion 70 of second side panel 44 may include any suitable mesh-type material that provides breathable functionality. Breathable functionality refers to the ability of the material to allow air to substantially move effectively therethrough. As used herein, when air is indicated as substantially moving effectively through a material, it is meant that the material includes openings (e.g., mesh openings, open-framework, spaces between elements thereof, or even those that may not be visually perceivable openings but still allow a breathable function to occur) that do not impede air movement to an extent that would prevent a human being from breathing through (e.g., when a human's respiratory openings (e.g., nose/mouth) are in direct contact with a material) such a material in order to prevent suffocation and further that such openings are too small to permit an infant to insert a finger or toe therethrough. For example, such materials may include cotton, silk, polyester, nylon, etc.

In one embodiment, the mesh-type material may include a mesh available from Apex Mills, Inc. under the trade designation TA1 Mesh. However, other various similar mesh materials (e.g., mesh material having suitable openings are available). A Suffocation Hazard Assessment was performed by RAM Consulting (Oak Brook, Ill.) (e.g., the Assessment is further described herein and for which protocol is available from RAM Consulting) on the TAI Mesh resulting in average readings of 1.6 cm $H_2O$ and, for an upper specification limit of 5 cm $H_2O$, a Z-value of 9.0 was obtained.

Preferably, the mesh-type material is a breathable integrated padded mesh material 300 (e.g., a padded spacer mesh), such as that show generally in FIGS. 2C-2F. The breathable integrated padded mesh material 300 includes openings 349 on a front substructure 391 thereof, as shown in top view of the material 300 of FIG. 2C. As shown in the cross-section of the breathable integrated padded mesh material 300 in FIG. 2F, the material 300 further includes a back substructure 392. A pile substructure 393 is integrated with and extends between the front and back substructures 391, 392. Each of the substructures (e.g., the front, back, and pile substructures) allows air to substantially move effectively therethrough. The material 300 is further shown in the perspective views of FIGS. 2D-2E.

Figure 2G:
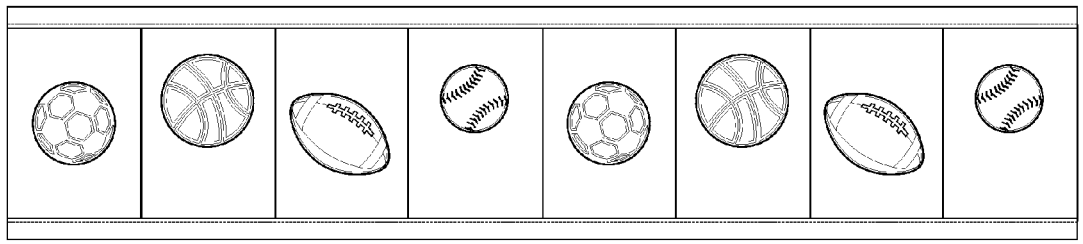
FIGS. 2G-H show illustrations of a printed mesh designs for crib bumpers and crib liners.
Figure 2H:
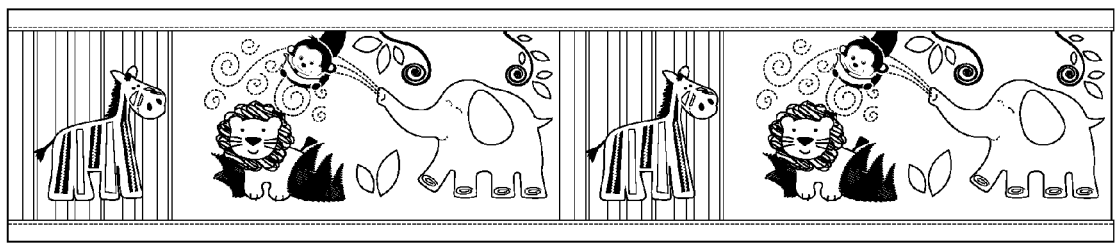

The meshes or other fabrics shown in FIGS. 2A-2F may include printed designs on the mesh. FIG. 2G shows an illustration of a printed mesh according to one embodiment of the disclosure. FIG. 2H shows an illustration of a printed mesh according to another embodiment of the disclosure.

It will be recognized that the thickness of the padded mesh material may vary, as well as for other materials described herein. For example, more padding may create a softer more plush effect with slightly different breathability/ventilation properties and more opaqueness (e.g., less light transmissive) whereas less padding may create more breathability and buoyancy with less opaqueness (e.g., more light transmissive). Preferably, the panels described herein are at least somewhat transparent such that at least motion of the child in the crib can be seen.

Yet further, the padded mesh material is collapsible. As such, when installed or uninstalled, should a child stand on it, the material will collapse. This reduces the risk of the mesh material being leverage to a climbing infant (unlike most conventional bumpers).

The breathable padded mesh material may be a woven polymeric fiber mesh material that is integrated with a front and back substructure 391, 392. The front substructure 391 may include larger openings on the front substructure 391 than on the back substructure 392. In one example embodiment, the padded mesh material 300 is integrated with the front and back substructures 391, 392 by weaving the fibers that are provided as part of the pile substructure 393 through the front and back substructure 391, 392 as shown in FIG. 2D-F. In another embodiment, the padded mesh material is integrated by sewing, or otherwise attaching, the padded mesh material 300 between a front and back substructure or other substructures (not shown). That is, in this embodiment the padded mesh material is integrated by attaching to other materials, such as breathable materials or pad materials, to form a multi-layer structure (not shown). The multi-layer structure may be, for example, laminated or quilted.

In one embodiment, for example, the breathable integrated padded mesh material 300 may include a padded spacer mesh available from Apex Mills, Inc. under the trade designation DNB27 Spacer Mesh. However, other various similar padded spacer mesh materials are available.

In another embodiment, the mesh-type material is a breathable integrated padded mesh material in combination with one or more other material layers. For example, the breathable integrated padded mesh material may be used in combination with one or more layers of other material adjacent to (e.g., one material laid flat against the other) either the front substructure and/or back substructure of the breathable integrated padded mesh material. In various embodiments of such a combination, one or more layers of material may be used adjacent the front substructure, one or more layers of material may be used adjacent the back substructure, or one or more layers of material may be used adjacent the front substructure and the back substructure. For example, such additional layers may be layers of cotton material, knit jersey material, etc. Such additional material layers may provide additional benefits such as, for example, thermal properties with breathability.

Further, for example, the breathable integrated padded mesh material when used alone, or in combination with one or more additional layers, may be any breathable integrated padded mesh material that has a suffocation resistance level of less than about 15 cm $H_2O$, and preferably less than about 5 cm $H_2O$. Such a suffocation resistance is determined according to the RAM Consulting Virtual Child Suffocation Hazard Assessment Model which is a physical model and testing methodology that quantitatively assesses the potential suffocation hazards posed by various types of materials. The details of this Model are available from RAM Consulting (Oak Brook, Ill.). Further, according to this Model, Z-values are determined that are statistical measurement tools that describe and predict product performance in relation to its specification limit (e.g., such as those described below). For example, the suffocation resistance limit of 5 cm $H_2O$ is an upper specification limit for materials or products that foreseeably are used and/or intended for young infants with high accessibility; and further, the suffocation resistance limit of about 15 cm $H_2O$ is an upper specification limit for other materials or products (e.g., those for toddlers). A Z-value of 4.0 or greater with the corresponding upper specification limit for each applicable testing technique is required for a product to be classified as a very low suffocation risk. The details regarding the determination of Z-values are available from RAM Consulting (Oak Brook, Ill.).

Suffocation Hazard Assessment was performed by RAM Consulting (Oak Brook, Ill.) on various configurations using the breathable integrated padded mesh material available from Apex Mills, Inc. under the trade designation DNB27 Spacer Mesh.

1 Configuration 1: Single Layer of Padded Spacer Mesh Configuration 2: Layer 1: Padded Spacer Mesh Layer 2: Cotton Configuration 3: Layer 1: Knit Jersey Layer 2: Padded Spacer Mesh Layer 3: Cotton Configuration 4: Layer 1: Cotton Layer 2: Padded Spacer Mesh Layer 3: Cotton Configuration 5: Layer 1: Knit Jersey Layer 2: Padded Spacer Mesh Layer 3: Knit Jersey Configuration 6: Layer 1: Padded Spacer Mesh Layer 2: Flannel Fabrics tested: Knit Jersey Manufacturer: NATEX Content: 50% Polyester/50% Cotton Knit Jersey Style#: INT Cotton Manufacturer: SOUTHERN BELLE Content: 100% Cotton Style#: L93N67 Flannel Manufacturer: QUILTERS CORNER Content: 100% Cotton Style#: RN41324

A screening was performed on all configurations in both a dry and wet state. The spacer padded mesh when layered with fabrics resulted in a satisfactory reading based on values in cm $H_2O$, wherein the specification upper limit for products young children are intended to lie on is equal to 5 cm $H_2O$ (e.g., mattress pads or items young infants are intended to have their face on) and wherein the specification for products young children are not intended to lie on is equal to 15 cm $H_2O$.

Four individual readings were performed with an average being determined. Dry state readings did not register, thus presenting very low hazard when the configurations were dry (i.e., under the 5 cm $H_2O$ specification limit). In the wet state (after application of 8 ml of sprayed on water), the average readings for the configurations were between 4.6 cm $H_2O$ and 6.2 cm $H_2O$.

For the individual single layer of spacer padded mesh, average readings of 1.7 cm $H_2O$ were taken. Further, for an upper specification limit of 5 cm $H_2O$, a Z-value of 9.5 was obtained.

As shown in FIG. 1A, the first side panel 42 is attached to first side rail 12 by wrapping first end 48 of the first spacer panel 42 about spaced side support element 27 and mating the hook and loop fastener portions 53, 55 as shown in FIG. 3A. The second end 50 of first spacer panel 42 is wrapped around side support element 29 and fastening apparatus 54 is used to hold the first side panel in place. For example, in one embodiment, the fastening apparatus 54 is attached to the side support element 27. Thereafter, the user pulls the panel taut across the plurality of spaced side support elements 20 by pulling on the second end 50 containing the fastening apparatus 54. Fastening apparatus 54 is the attached to support element 29 in such a manner to hold the taut panel in place. As such, the first side panel 42 is prevented from slipping after being attached to the spaced side support elements 27, 29.

In at least one embodiment, the first side panel 42 is configured to cover at least a portion of the first side rail 12 and to extend substantially along the length of the crib 10. As used herein when a panel extends substantially along the length of the crib 10, it will be recognized that the panel may not extend completely along the entire length, but may end proximate the headboard and footboard. For example, depending upon the fastening techniques used, the panel may be attached a short distance from the corner posts of the crib (see panel 42 as shown in FIG. 1A).

In a like manner, second side panel 44 is attached to the crib 10. For example, the second end 74 of the second side panel 44 is wrapped about spaced support element 35 of headboard 18. Fastening apparatus 78 (e.g., Velcro closures) is used to fasten the second end 74 about the support element 35.

Further, as shown in FIG. 1A, the body portion 70 of the second side panel 44 is fed to the inside of the crib 10 (e.g., to the inside portions of support elements 34) and thereafter fed to the outside of the crib 10 and around corner post 36. The body portion 70 is continued to be fed back into the inside of the crib 10 (e.g., to the inside of the support elements of the second side rail 14) and thereafter fed once again to the outside of the crib 10 and around corner post 31 (see FIGS. 3B-3C). Thereafter, the body portion 70 of the second side panel 44 is fed to the inside of the crib 10 once again at the footboard 16 and then wrapped around support element 19 of footboard 16 in a similar manner to the fastening of the second side panel 44 around support element 35 of headboard 18.

One will recognize that the second side panel may be attached to any number of different support elements, may be fed around and/or to the outside of one or more spaced support elements, and, as with the first side panel 42, is pulled taut prior to fastening to keep the second side panel 44 in position. Further, the weaving of the second side panel 44 around the corner posts and/or around one or more of the spaced support elements also assists in maintaining the second side panel 44 in position (e.g., in a position higher on the crib 10 when the mattress is raised relative to the floor and lower in the crib 10 when the mattress is lowered to the floor). In addition, any of the panels may be positioned such that a portion of the panel is below the upper surface of the mattress (e.g., a few centimeters below the surface along the side of the mattress) to assist in securing the crib and preventing arms and legs from going under the panel.

In another embodiment, the crib shield system may comprise a single side panel, which may be used with cribs without a movable side rail. As shown in FIG. 1B, the crib 10 is substantially the same as that shown in FIG. 1A except that the side rail 12 is fixed and cannot be lowered or raised.

The single side panel 111, as shown in FIG. 1B, includes a body portion 70 that extends along a length (L panel 3) from a first end 72 thereof to a second end 74 of the single side panel 111, in a like manner with the second side panel 44 in FIG. 2B. The length (L panel 3) of the single side panel 111 may be sized for allowing attachment to footboard 16 and headboard 18 and across side rail 12 and 14 of crib 10. For example, the length (L panel 3) is slightly longer than the combined lengths of the four sides of the crib 10 (i.e., the lengths of the footboard 16, headboard 18, side rail 12, and side rail 14). In this embodiment, the single side panel 111 may be wrapped about support elements 35, installed along all four sides of the crib, and fastened to support elements 27 using hook and loop closures, as shown in FIG. 3A. Further, the single side panel 111 may have a width (W panel 3) that, at least in one embodiment, may have substantially the same width as the width (W panel 1) of first panel 42.

Further, as shown in FIGS. 1B-1C, single side panel 111 may include fastening apparatus 110a-c at first end of the single side panel 111 and fastening apparatus at the second end of the single side panel 111. Such fastening apparatuses 110a-c are substantially similar to the hook and loop fasteners described with respect to first panel 42. In one embodiment, finishing edge material 80 may be attached around the perimeter of the body portion 70 as shown by the finishing material 80 along edges 81-84.

As shown in FIG. 1B, the single side panel 111 may be attached to headboard 18 by wrapping first end 72 of the single side panel 111 about spaced side support element 35 and mating the hook and loop fastener portions 110a-c, as shown in FIG. 3A.

Further, as shown in FIG. 1B, the body portion 70 of the single side panel 111 may be fed to the inside of the crib 10 (e.g., to the inside portions of support elements 34) and thereafter fed to the outside of the crib 10 and inside corner post 36. The body portion 70 may be continued to be fed back into the inside of the crib 10 (e.g., to the inside of the support elements of the second side rail 14) and thereafter fed once again to the outside of the crib 10 and inside corner post 31 (see FIGS. 1B, 1C). Thereafter, the body portion 70 of the single side panel 111 may be fed to the outside of the crib 10 once again at the footboard 16 and then fed inside of corner post 33 to the inside of the crib 10 (e.g., to the inside portions of support elements 20). Finally, the second end 74 of single side panel 111 may be wrapped around side support element 27 and fastening apparatus is used to hold the single side panel in place. Thereafter, the user may pull the panel taut across the plurality of spaced side support elements on all four sides of the crib by pulling on the second end 74 containing the fastening apparatus. Fastening apparatus may be attached to support element 27 in such a manner to hold the taut panel in place. The single side panel 111 may be deterred from slipping after being attached to the spaced side support elements 35, 27.

As shown in FIG. 4A, the crib 10 is substantially the same as that shown in FIGS. 1A-1C except that the mattress 26 is in a lowered position. However, the side rail 12 is a side rail that can be lowered or raised, as desired. Like the crib shield system 40 in FIG. 1A, crib shield system 100, shown in FIG. 4, allows the side rail 12 to be moved even with the crib shield system 100 attached to crib 10.

Crib shield system 100 includes a first side panel 102 and a second side panel 104 for attachment to respective side rails 12, 14. Further, the crib shield system 100 includes a first end panel 106 for attachment to the footboard 16 and a second end panel 108 for attachment to the headboard 18.

Figure 4B:
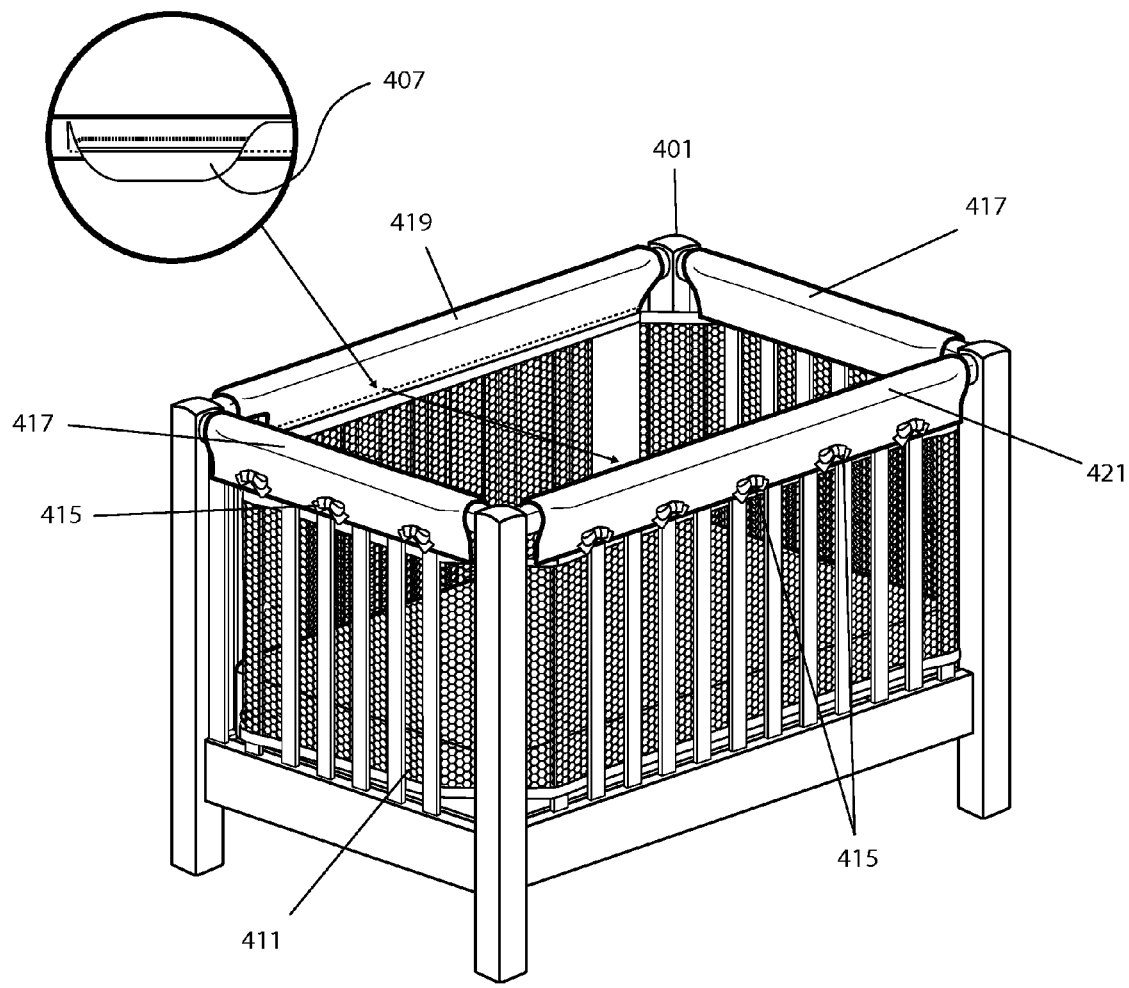
FIG. 4B shows a perspective view of another embodiment of a full crib shield system attached to a crib.

FIG. 4B shows a perspective view of another embodiment of a full crib shield system attached to a crib. A mesh 411 extends around a crib 401. A number of ties 415 attach side rail covers 417, a back rail cover 419, and a front rail cover 421 to the mesh 411. A hidden zipper (not shown) may attach a front side of the rail covers 417, 419, and 421 to the mesh 411. The hidden zipper may be concealed by a flap 407, such as in a gusset pocket. In some embodiments, the rail covers 417, 419, and 421 may be available as upgrades to a basic mesh crib liner 411. The rail covers 417, 419, and 421 may be a solid color or include patterns and be made of washable material with quick drying capability.

FIG. 5 shows the first side panel 102 of crib shield system 100 in an unattached laid flat position. The first side panel 102 includes a body portion 120 formed of a mesh-type material. In one embodiment, the mesh-type material is an open framework material that includes openings too small to permit an infant to insert a finger or toe therethrough. However, any mesh-type material described herein may be used as well.

The body portion 120 extends along a length (L panel 1) extending from a first end 122 of the first side panel 102 to a second end 124 thereof. Further, the laid flat first side panel 102 has a width (W panel 1) that is sized to cover at least a substantial portion of side rail 12.

As used herein, when referring to the covering of a substantial portion of a side rail (or headboard or footboard, at least two-thirds of the side rail 12 is covered. However, the first side panel may cover less than a substantial portion. For example, the first side panel may cover just a majority of the entire side rail 12.

The first side panel 102 further includes a fastening apparatus 126 that extends along an entire edge 144 of the side panel 102 for use in attaching the side panel 102 to the top bar 22 of the side rail 12, as is shown in further detail in FIGS. 6A-6D. The fastening apparatus 126, at least in one embodiment, includes first and second fastening portions 147, 148 that are both for mating with one another in order to hold the first side panel 102 in a fixed position relative to side rail 12.

In another embodiment, the fastening apparatus 126 may be a series of straps or ties intermittently disposed along the edge 144 of the side panel 102 for use in attaching the side panel 102 to the top bar 22 of the side rail 12, as is shown in further detail in FIGS. 18-20 below. Each of the straps or ties of fastening apparatus 126, at least in one embodiment, includes first and second fastening portions 147, 148 that are both for mating with one another in order to hold the first side panel 102 in a fixed position relative to side rail 12.

Figures 6A, 6B:
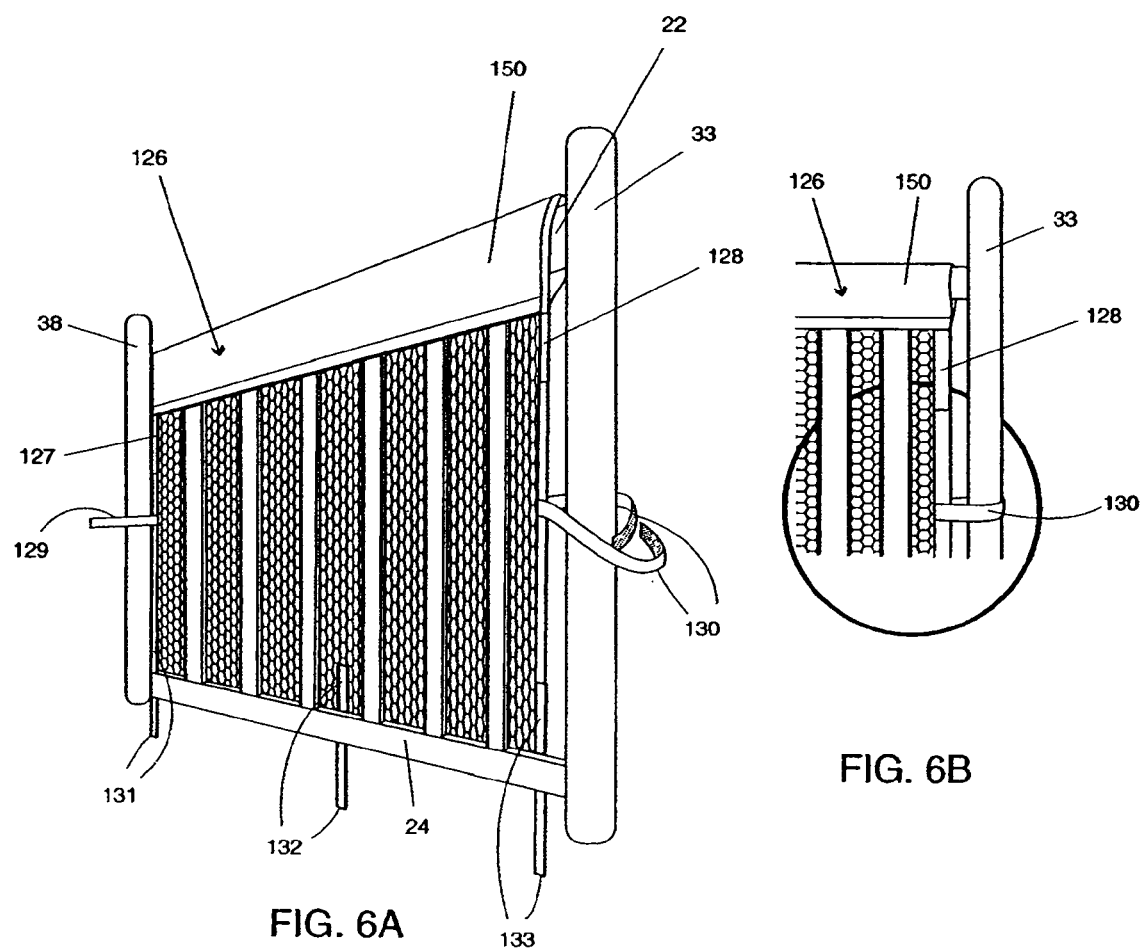
FIGS. 6A-6F show various illustrations for use in describing the attachment of the side panel shown in FIG. 5 to a crib side rail according to one embodiment of the present invention.

As shown in FIG. 6A, the fastening apparatus 126 includes a padded portion 150 that is wrapped around top rail 22 such that first and second fastening portions 147, 148 can be placed in contact with one another. As a result, the padded portion 150 covers the top bar 22 of the side rail 12. With use of the fastening apparatus 126 that extends along the entire edge 148 of the first side panel 102, the first side panel 102 can be fixed in a stable position with respect to side rail 12. For example, the first side panel 102 can be fixedly positioned to prevent movement thereof relative to the side rail 12 using one or more other various fastening apparatus.

In another embodiment, the padded portion 150 may be removably attached to the fastening apparatus 126. For example, the padded portion 150 may comprise a strip of padded material with one fastening side, the fastening side designed to be removably attached to the fastening apparatus 126 using hook and loop fasteners, snaps, zippers, or other appropriate fastening apparatus. The padded material may be any suitable material, not just the aforementioned mesh-type material.

For example, as shown in FIG. 5A, closures 127-128 provide for additional affixing functionality about the top bar 22 of the crib 10. In addition, closures 129-130 assist in affixing the first side panel 102 to respective corner posts 38, 33. Yet further, for example, a plurality of closures 131-133, located opposite the edge 144 can be used to attach the first side panel 102 to bottom bar 24 of the side rail 12 such that the panel 102 is held in a taut manner across the plurality of support elements 20.

FIG. 5B shows a back side of a crib shield mesh according to the present invention. A crib shield 102 may include one or more ties 115 along a top end of the crib shield 102. The ties 115 may allow connection of the crib shield 102 with a rail cover described below with reference to FIG. 5D. Although not shown, the ties 115 may also be coupled to a bottom end of the crib shield 102. The crib shield 102 may also include a number of Velcro loops 113 including Velcro attachments 113a, 113b, and 113c, and Velcro receptors 113d, 113e, and 113f. The receptors 113d, 113e, and 113f may loop around a support structure (not shown), such as a crib, and hook around to couple to the attachments 113a, 113b, and 113c.

FIG. 5C shows a front side and several magnified views of a side panel for use in a crib shield system according to the present invention. The crib shield 102 of FIG. 5C may illustrate a side of the crib shield 102 facing an inside of a crib. The crib shield 102 may have a size of approximately 128 inches by approximately 19.5 inches. A fastener 105a may couple the crib shield 102 to a front/back crib rail cover 103 through a fastener 105b. The cover 103 may have a size of approximately 46 inches by approximately 14 inches. The fastener 105a and 105b may be a half of a zipper and the zipper pull located on one or the other of fastener 105a and 105b. For example, the rail cover 103 may include the zipper pull 105b, such as a dual separating zipper, which may be opened or closed from either end. A flap 107 may extend over the fastener 105a to conceal the zipper. Although a zipper is illustrated connecting the crib shield 102 and the rail cover 103, other fasteners such as buttons, snaps, and ties are possible. A second rail cover may be used for sides of a crib. FIG. 5D shows a side view of a second crib rail cover. The cover 107 includes ties 115 for coupling to the ties 115 of the crib shield 102 illustrated in FIG. 5B.

The rail cover 103 may include multiple layers of material. FIG. 5E is an illustration of a rail cover having multiple layers of fabric. For example, the cover 103 may include an outer layer 151 such as mesh fabric, a middle layer 153 such as a padded filler, and a bottom layer 155 such as a waterproof layer, allergen-blocking layer, or other fabric. The cover 107 may have a size of approximately 27 inches by approximately 14 inches.

One skilled in the art will recognize that many types of closures may be used to provide the attachment functionality, such as those described previously herein with respect to crib shield system 40. In one particular embodiment, all of the closures are provided with hook and loop fasteners (e.g., Velcro fasteners). In such a manner, no ties are necessary, which eliminate additional material that could be grabbed by a small child and pulled upon.

FIGS. 6A-6D show further detail illustrating the attachment of the first side panel 102 to the crib 10. FIG. 6A shows the fastening apparatus 126 wrapped around the top bar 22 of the crib 10 and, in particular, a closure 130 wrapped around post 33 but not yet in a closed position.

FIG. 6B shows the closure 130 in a wrapped around configuration and closed (e.g., the hook and loop fasteners in direct contact with one another and providing attachment to corner post 33).

Figure 6C:
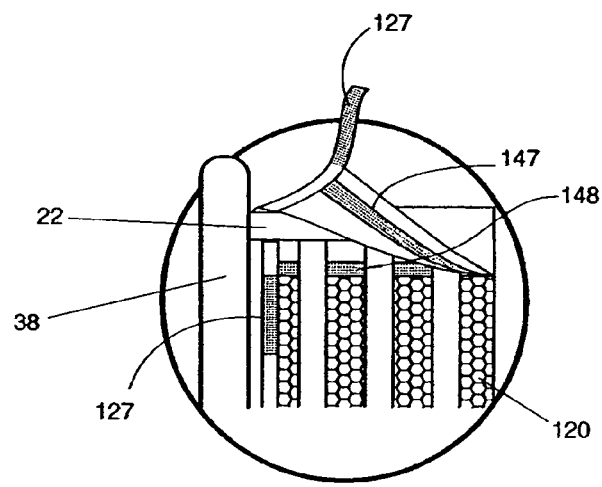

FIG. 6C shows the fastening apparatus 126 in further detail, including fastening portions 147-148 and closure 127 in a partially unattached configuration.

Figure 6D:
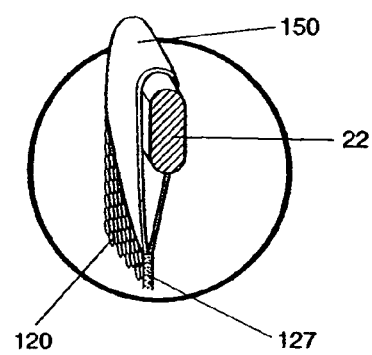

FIG. 6D shows a cross-section view of the top bar 22 having the padded rail cover portion 150 wrapped therearound.

Figure 6E:
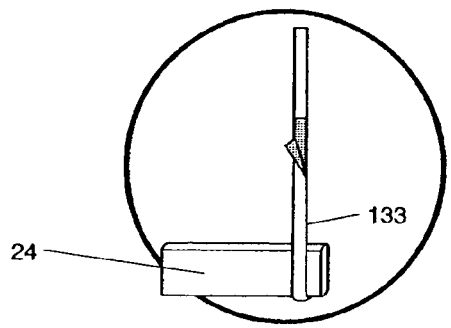

FIG. 6E shows one of the bottom closure strap attachments 133 used to wrap around bottom bar 24. The strap attachment 133 is shown in a partially closed position with a part of the hook and loop fasteners in direct contact.

Figure 6F:
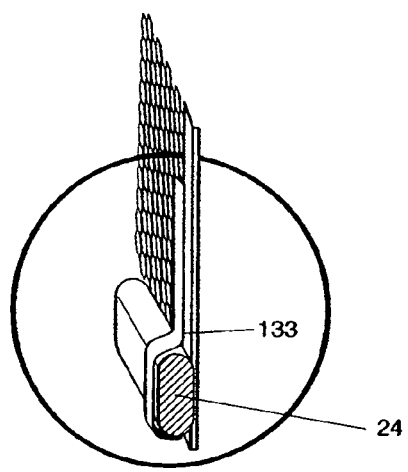

FIG. 6F shows a cross-section of the bottom bar 24 having strap attachment closure 133 wrapped therearound and in a fastened configuration.

It will be readily understood that second side panel 104 is substantially similar to that of first side panel 102. In addition, the attachment of second side panel 104 to side rail 14 is performed in substantially the same manner as the attachment of first side panel 102 to side rail 12 of crib 10.

Figure 7A:
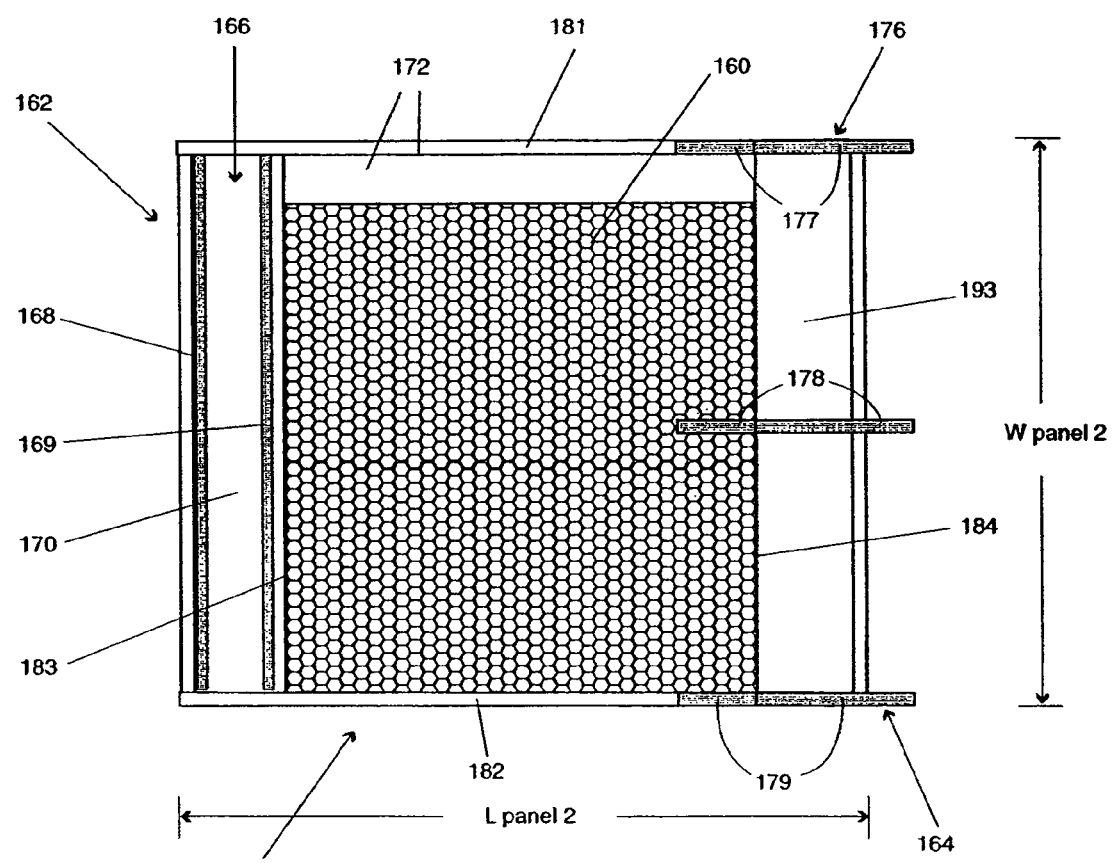
FIG. 7A shows a top view of an end panel for use in the full crib shield system shown in FIG. 4A according to the present invention in an unattached position laid flat.

FIG. 7A shows the end panel 108 in an unattached laid flat position. The end panel 108 includes a body portion 160 of mesh-type material like that described with respect to first side panel 102 which extends along a length (L panel 2) from a first end 162 to a second end 164 of the end panel 108. Further, the end panel 108 has a width (W panel 2) that along with length (L panel 2) is sized to cover a substantial portion of headboard 18. The end panel 108 includes fastening apparatus 166, for example, along the entire edge 183 of the body portion 160 for use in attachment of the end panel 108 to a support element 37 of the headboard 18. The fastening apparatus 166 includes fastener portions 168-169 and a body portion 170. The body portion 170 is wrapped around the support element 37, as shown in further detail in FIG. 8, with the fastener portions 168-169 placed in direct contact with one another to provide attachment of the end panel 108 to the headboard 118. The fastener portions 168-169 are preferably hook and loop fasteners to provide a consistent closure along the entire width (W panel 2).

At least one other fastening apparatus, such as fastening apparatus 176, are provided at one or more positions along an edge 184 opposite edge 183 to allow a user to pull the panel taut across the headboard 118 when fastening apparatus 166 has been attached to support element 37. Such fastening apparatus 176 can be thereafter used to secure the end panel 108 around support element 35 and maintain the end panel 108 in a taut position adjacent the support elements 34. In one embodiment, the fastening apparatus 176 includes hook and loop fasteners 177-179 (e.g., Velcro closures) positioned along edge 184 using a body of material 193 that can be wrapped about support element 35.

Figure 7C:
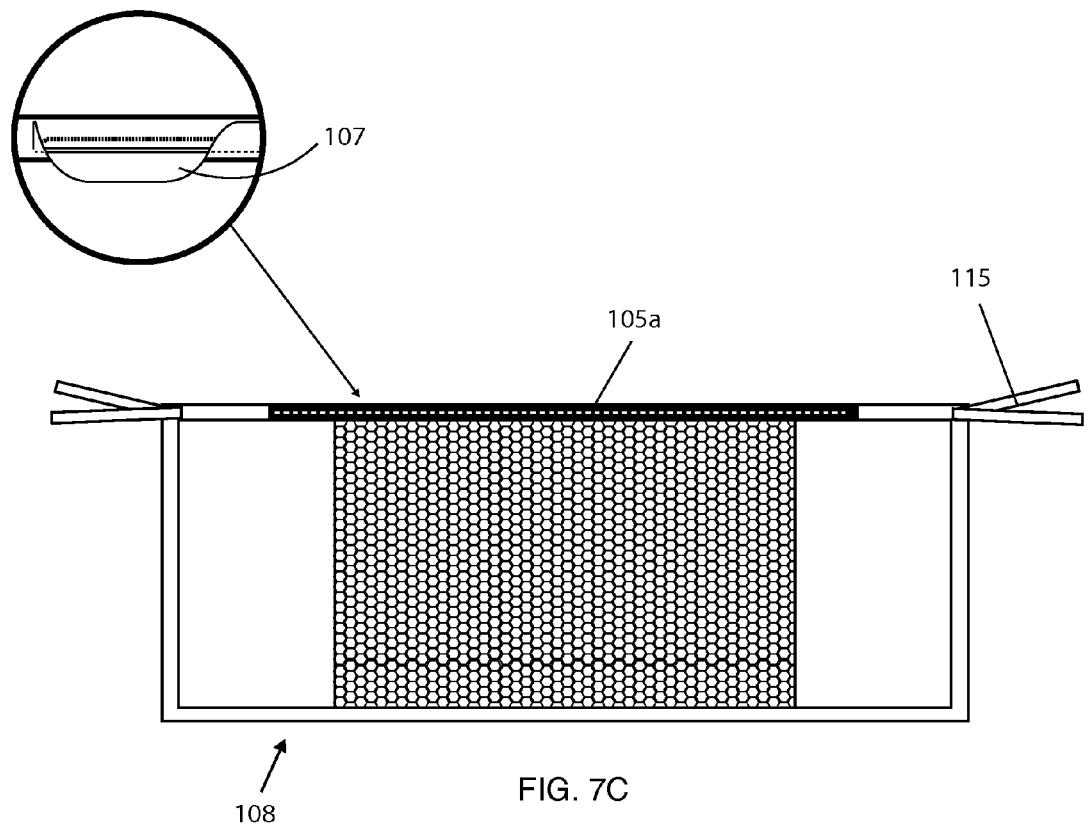
FIG. 7C shows a front side of a back panel wrap for attaching to a rail cover according to the present invention.
Figure 7B:
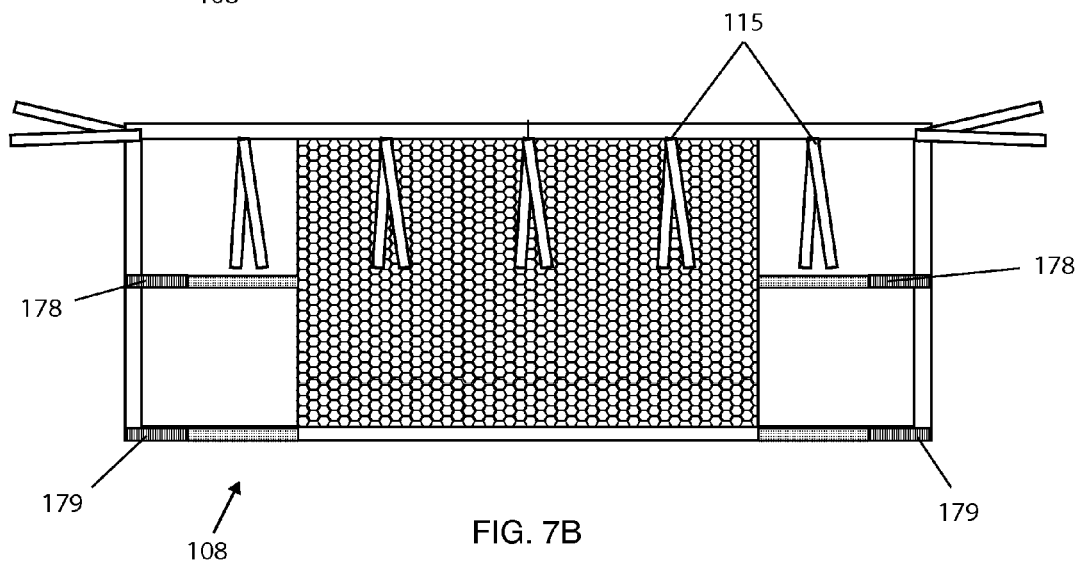
FIG. 7B shows a back side of a back panel wrap for attaching to a rail cover according to the present invention.

FIG. 7B shows a back side of a back panel wrap for attaching to a rail cover according to the present invention. The short back panel 108 may include a number of ties 115 for coupling to a rail cover. The short back panel 108 may also include a number of hook and loop fasteners 178 and 179.

FIG. 7C shows a front side of a back panel wrap for attaching to rail cover according to the present invention. The front side of the short back panel 108 may face an inside of a crib. The back panel 108 may include a receptor 105a for coupling to a rail cover. The receptor 105a may be, for example, one half of a zipper or one half of a zipper with a zipper pull. The flap 107 may conceal the receptor 105a. The back panel 108 may have a size of approximately 56 inches by approximately 22 inches.

Figure 8:
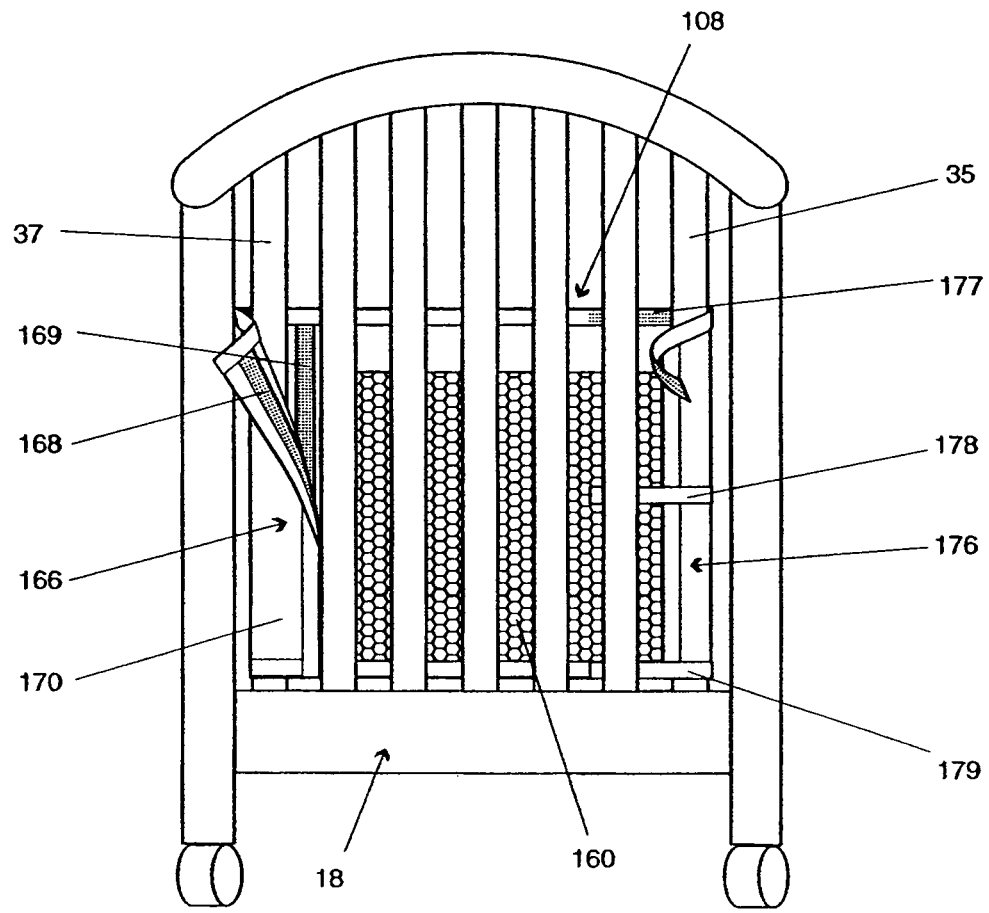
FIG. 8 shows an illustration for use in describing attachment of the end panel shown generally in FIG. 7A to a headboard or footboard of a crib according to one embodiment of the present invention.

FIG. 8 shows an illustration of attaching the end panel 108 to headboard 118. For example, as shown therein, closure 177 is in an unattached configuration, whereas closures 178, 179 are in a fastened configuration. Likewise, fastening apparatus 166 along the first end 162 of the end panel 108 is shown in a partially fastened configuration.

It will be readily understood that second end panel 106 is substantially similar to that of first end panel 108. In addition, the attachment of second end panel 106 to the footboard 16 is performed in substantially the same manner as the attachment of first end panel 108 to headboard 18 of crib 10.

Both the side panel 102 and the end panel 108 may be provided with associated finishing material for functional or decorative purposes (e.g., to prevent the fraying of mesh material of body portion 120, to provide further padding, etc.). For example, as shown in FIG. 5A, finishing edge material 138 may be used along edges 141-143. Likewise, as shown in FIG. 7A, finishing material 172 may be used along edges 181-182. Further, it will be recognized by one skilled in the art that various types of materials may be used along the edges and in combination with various fastening apparatus for attaching the panels to the crib 10. However, preferably, substantially the entire exposed portions of the panels (e.g., exposed to a child in the crib) are formed of the mesh-type material.

Figure 20A:
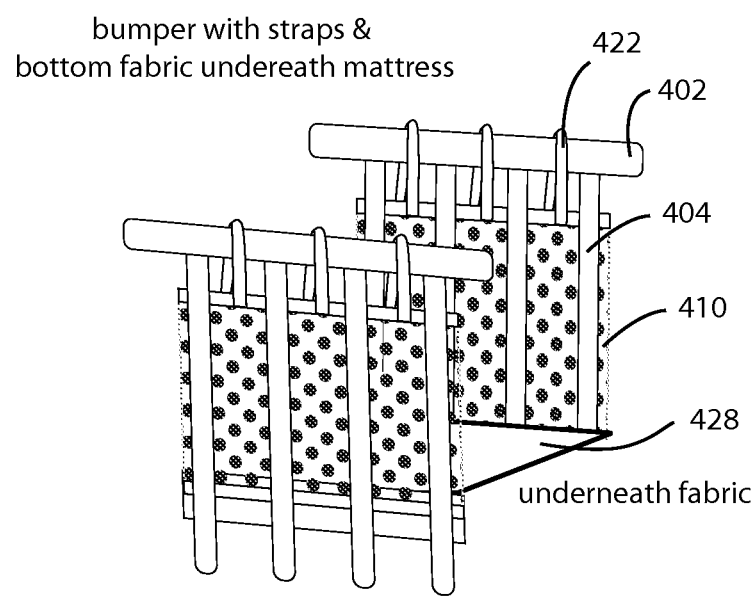
FIGS. 20A-B show an illustration of one embodiment of a crib liner with a underneath mattress fabric according to the present invention.
Figure 20B:
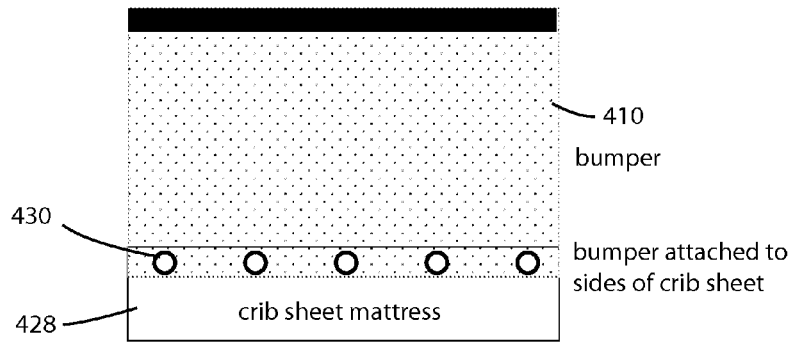
Figure 21A:
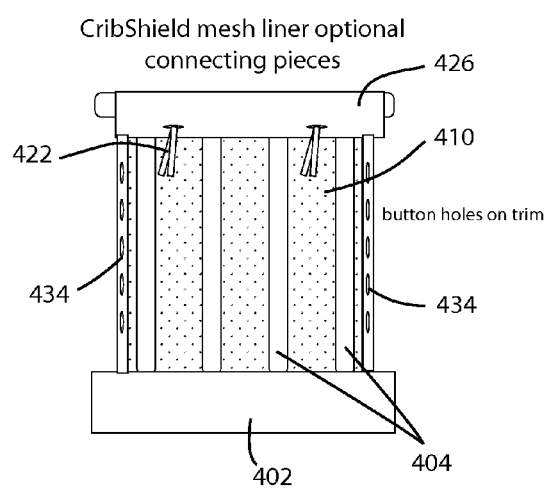
FIGS. 21A-B show an illustration of one embodiment of an expandable crib liner according to the present invention.
Figure 21B:
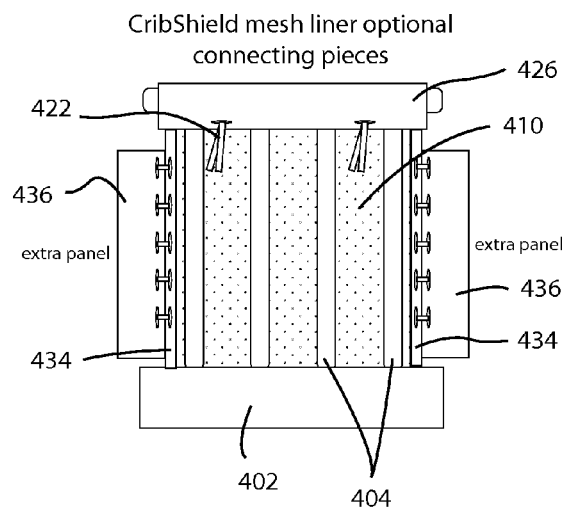

In another embodiment, the crib shield system may comprise a crib liner with two side panels 106,108, two end panels 102,104, and a bottom panel 428, where the side and end panels are attached to the bottom panel, as is shown in further detail in FIGS. 20A-20B.

FIG. 20B shows the crib liner in an unattached laid flat position. The bottom panel 428 may have substantially the same length and width as a crib mattress. The side panels 106,108 may have substantially the same length as the length of the bottom panel 428. The end panels 102,104 may have substantially the same length as the width of the bottom panel 428. In this embodiment, the crib liner may be placed directly on top of the mattress, and the side and end panels attached to the four sides of the crib using fasteners 430, which may be disposed continuously or intermittently along the outer edges of the side and end panels.

As used herein, when reference is made to the panels having substantially the entire exposed portions thereof being formed of the mesh-type material, it means that at least two-thirds of the exposed portions are formed thereof. However, in some configurations, less than substantially the entire exposed portions may be formed thereof. For example, a majority or more of the exposed portions may be formed of the mesh-type material.

The panels formed of the mesh-type material may be used in combination with one or more layers of other material adjacent to the mesh-type material. For example, in one embodiment the body portion of the panels may be formed with strips of padded material attached to the mesh-type material on one side. The strips of padded material may be disposed such that when the panels are attached to a crib, the padded materials line up with the vertical support elements of the crib and offset the mesh-type material from the vertical support elements, thus providing additional padding. The padded material may be any suitable material, not just the aforementioned mesh-type material.

The breathable materials allow for full air circulation. When a padded, soft breathable mesh material is utilized, further protection is provided to a child from bodily harm. When using one or more of the breathable mesh materials described herein, it is preferred that substantially no rebreathing of carbon dioxide occur when a child's face is in direct contact with the material.

Figure 14:
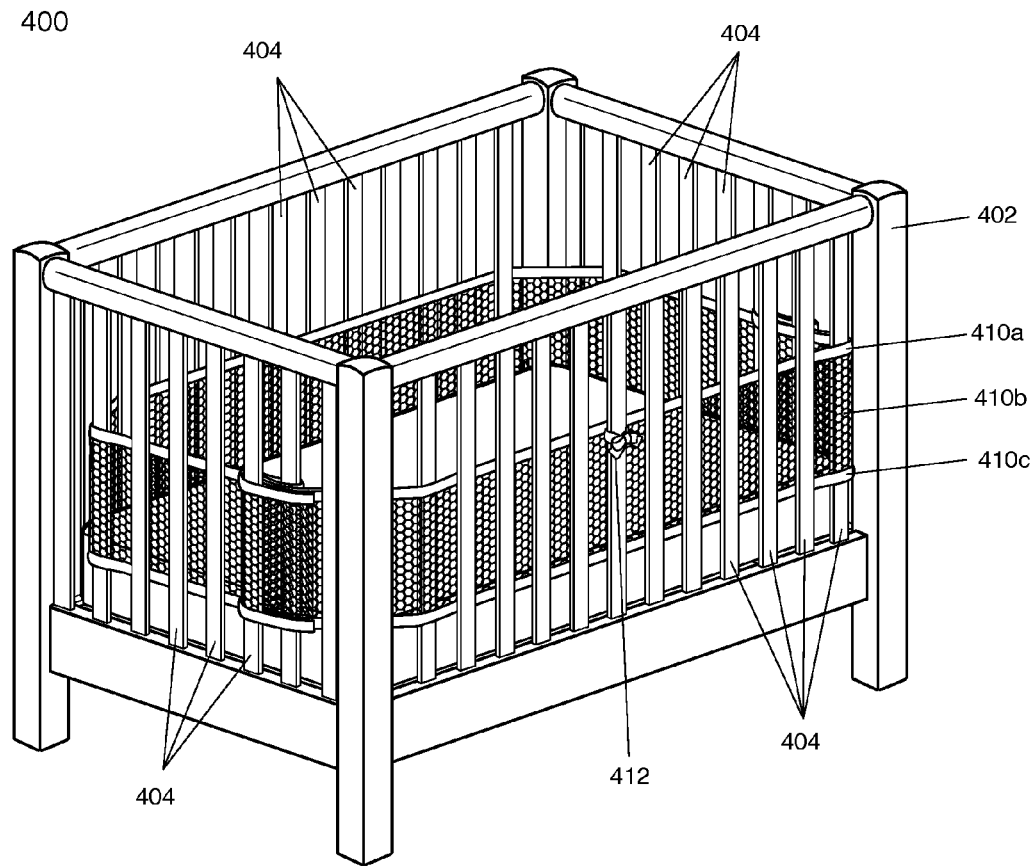
FIG. 14 shows an illustration of one embodiment of a crib liner according to the present invention.

FIG. 14 shows a crib liner according to one embodiment of the disclosure. A crib frame 402 may include a number of slats 404. A crib liner 410 may be weaved in and out of various slats 404. The crib liner 410 may provide cushioning for a child in the crib 402 to prevent injury from impact with the slats 404. The crib liner 410 may also provide a barrier to prevent a child in the crib 402 from extending appendages through the slats 404. The crib liner 410 may include a top portion 410a and a bottom portion 410b separated by a single layer mesh fabric 410c. The mesh fabric 410c includes a number of holes allowing circulation of air as described in detail above.

The top portion 410a and the bottom portion 410b of the crib liner 410 may be similar materials or different materials. In one embodiment, the top portion 410a and the bottom portion 410b may be fabric material provided for aesthetic purposes to improve the appearance of the mesh fabric 410c. According to another embodiment, the top portion 410a and the bottom portion 410b may be a cushioning material, such as fabric material filled with padding.

The crib liner 410 may be weaved in and out of each of the slats 404 as shown in FIG. 14 and secured to the slats 404 by a fastener 412. The fastener 412 may be, for example, a ribbon that is tied around one of the slats 404 and tied in a bow. Although only one fastener 412 is illustrated, additional fasteners may be included to provide additional support.

According to one embodiment, the crib liner 410 may be a one-piece bumper wrap design. The crib liner 410, when a one-piece bumper wrap design, may be adjusted for different crib sizes by wrapping the liner 410 multiple times around the slats 404 to consume a portion of the liner 410 in excess length that the perimeter of the crib 402. According to other embodiments, the crib liner 410 may be a multi-piece bumper. For example, the crib liner 410 may include several lengths of shorter material, which may be assembled together to form an appropriate length for the crib 402. Thus, the crib liner 410 may be adapted for use on cribs of different sizes.

Figure 15B:
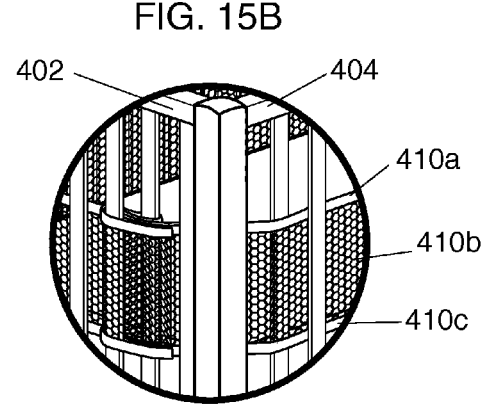
FIGS. 15A-C show a detailed illustration of one embodiment of a crib liner according to the present invention.
Figure 15A:
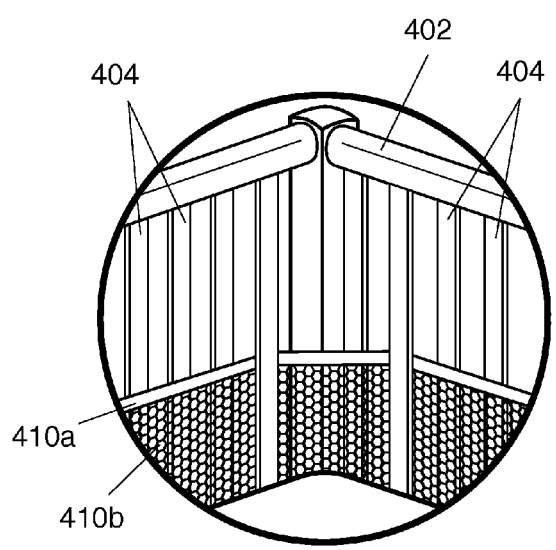
Figure 15C:
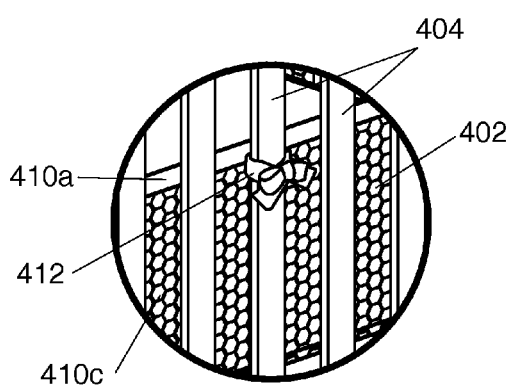

Additional detailed illustrations of the crib liner 410 are shown in FIGS. 15A-C. As shown in FIG. 15 the crib liner 410 may be weaved through the slats 404 only at corners of the crib 402. Installing the crib liner 410 by weaving through the slats 404 at corners of the crib 402 may decrease the installation time of the crib liner 410 on the crib 402.

Further details of the crib liner 410 are described below with reference to FIGS. 16-20. FIGS. 16A-C shows an illustration of the crib liner 410 having crib slat pads according to embodiments of the disclosure. FIG. 16A illustrates a view of a crib liner 410 with crib slat pads 420 as seen from the outside of the crib after installation of the crib liner 410. The crib slat pads 420 cover at least the portion of the slats 404 facing inside the crib 402. The crib slat pads 420 may be made of fabric or other materials.

The crib slat pads 420 may be attached to the slats 404 through attachment mechanisms such as, for example, sewing, snapping, tying, zipping, Velcroing, buttoning, free form molding, clipping, and/or strapping the slat pads 420 to the slats 404. According to one embodiment, the slat pads 420 are separate pieces that are inserted between the slats. According to another embodiment, the slat pads 420 line the inside of the crib 402 and adhere to the slats 404. FIG. 16B shows the crib liner 410 with slat pads 420 as viewed from the inside of the crib 402. The slat pads 420 may cover substantially all of the slat 404 facing inside the crib.

In certain embodiments, such as that of FIG. 16A, the slat pads 420 do not extend the entire circumference of the slat 404 such that a portion of the slat 404 is exposed. According to another embodiment, the slat pads 420 may be installed behind the crib liner 410 as shown in FIG. 16C. In this embodiment, the crib liner 410 may be attached to the front of the slat pads 420.

FIG. 17 shows a two-part bumper system. According to one embodiment, the mesh 410c of the crib liner 410 may be comprised of multiple fabrics or a combination of other materials. For example, the mesh 410c may be divided into an upper fabric 410c1 and a lower fabric 410c2. The lower fabric 410c2 may be selected to be a fabric having higher breathability than the upper fabric 410c1. Thus, additional airflow may be allowed into the crib 402 at the child's head level.

Other configurations of the crib liner 410 with one or more fabric layers in the mesh are possible. According to one embodiment, the mesh 410 may include two or more cotton or poly-breathable outer layers with a breathable spaces mesh in-between the two or more outer layers. According to another embodiment, the mesh 410 may include two or more cotton or poly-breathable outer layers with a breathable poly foam in-between. According to yet another embodiment, a breathable poly foam may be placed in-between a thin mesh and a spacer mesh. Each of these configurations may comprise the entire liner 410 or may be added to the crib liner 410 as additional layers. Further, these configurations may be applied to any of the embodiments described in this disclosure.

FIG. 18 shows the crib liner 410 with top rail attachments 422 according to one embodiment of the disclosure. As described above, the crib liner 410 may be attached to the crib 402 through various mechanisms. According to one embodiment, straps 422 are attached to the crib liner 410 such that the strap 422 may be extended over a rail of the crib 402 and attached again to the crib liner 410. The attachment 422 may be straps, ties, Velcro, buttons, snaps, and/or a zipper.

FIG. 19A shows the crib liner 410 attached to a second crib liner 424. As a child grows the crib liner 410 may become insufficient to protect the child from the dangers of the slats 404. The second crib liner 424 may be attached to the crib liner 410 to extend the height of the crib liner 410. According to one embodiment, the second crib liner 424 may be the same material as the crib liner 410. However, the second crib liner 424 may also be different material than the crib liner 410. For example, the crib liner 410 may be a more breathable material than the second crib liner 424 to allow increased airflow to the child in the crib 402 when the child is laying down and sleeping. The second crib liner 424 may include attachment 422 as described above for attaching the second crib liner 424 and the first crib liner 410 to the crib 402.

FIG. 19B shows the crib liner of FIG. 19A having the crib liner 410 and the second crib liner 424 may include a padded cover 426. The padded cover 426 may cover a portion of the crib 402 to protect a child from impact with the hard surfaces of the crib 402. The cover 426 may include slits through which the attachments 422 enter and exit the cover 426. The cover 426 may be installed on, for example, a top railing of the crib 402. However, the cover 426 may also be installed on other longitudinal structures of the frame from which the liners 410 and 424 may extend.

FIGS. 20A-B show a crib liner 410 with an underneath mattress fabric 428. The fabric 428 may be attached to the liner 410 or structurally integrated into the crib liner 410. Extending the crib liner 410 underneath a mattress with the fabric 428 may prevent the liner 410 from slipping and prevents a child from extending appendages into otherwise unprotected spaces. The fabric 428 may be attached to one portion of the liner 410 and then stretched and attached to another portion of the liner 410 to allow the fabric 428 to fit cribs of different sizes. The fabric 428 may be attached to the liner 410 through fasteners 430 including sewing, strapping, tying, Velcroing, snapping, and/or zipping.

FIGS. 12A-B show a crib liner 410 with a receptor 434 for additional connecting pieces such as extra panels 436. Through the receptor 434 additional components may be affixed to the liner 410 though any of the attachment mechanisms described above. According to one embodiment the additional components may be, for example, the panels 436.

Figure 9:
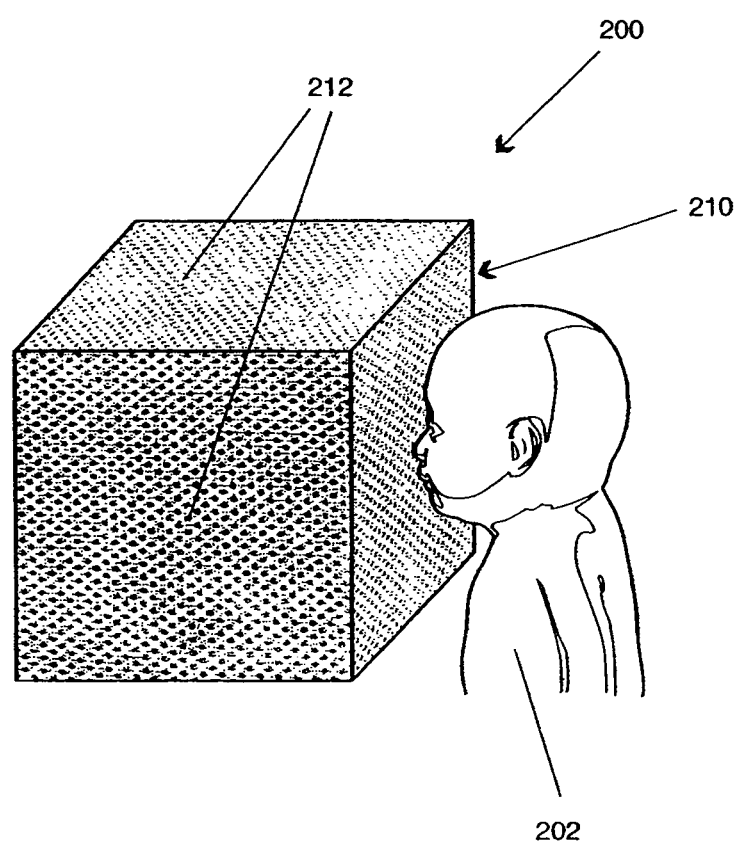
FIG. 9 is a diagram showing a general embodiment of a breathable apparatus according to the present invention.

FIG. 9 shows a general illustrative block diagram embodiment of a breathable apparatus 200 that includes a body portion 210 having one or more surfaces 212. In one particular embodiment, the body portion 210 is useable in proximity to the respiratory orifices (e.g., mouth and nose) of a human being 202. Further, in another embodiment, substantially all of the one or more surfaces are formed of the breathable integrated padded mesh material, a material described herein.

Figure 10A:
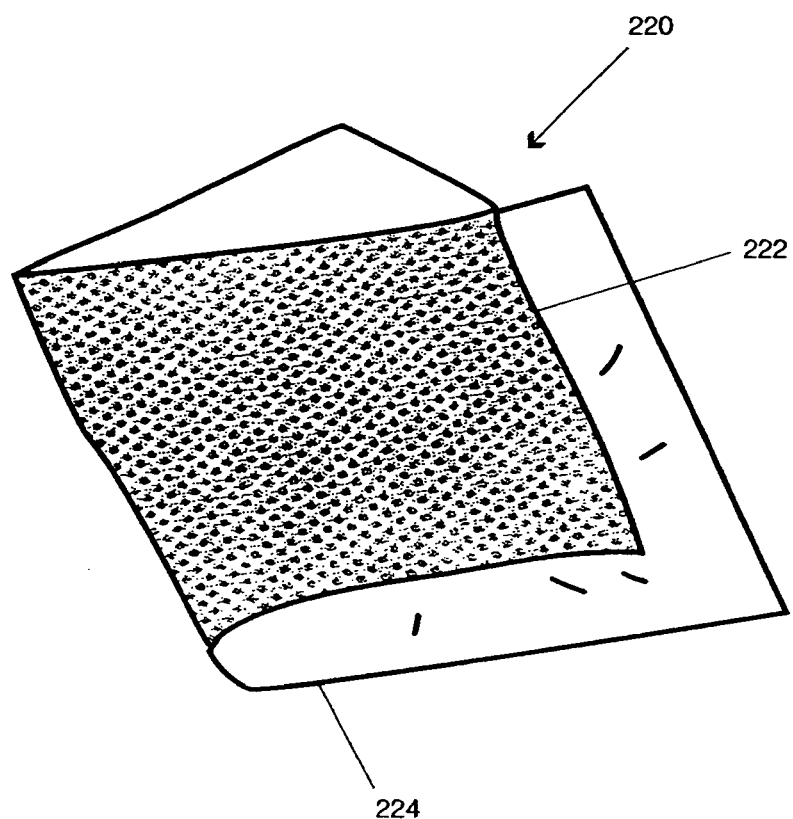
FIGS. 10A-10C show illustrations of a breathable blanket and a breathable comforter, along with more detail thereof, respectively, according to the present invention.
Figure 10B:
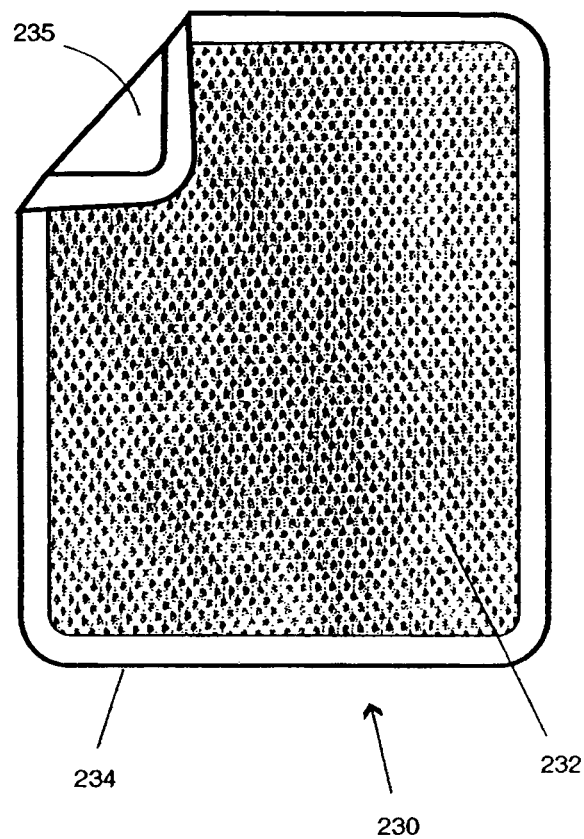
Figure 10C:
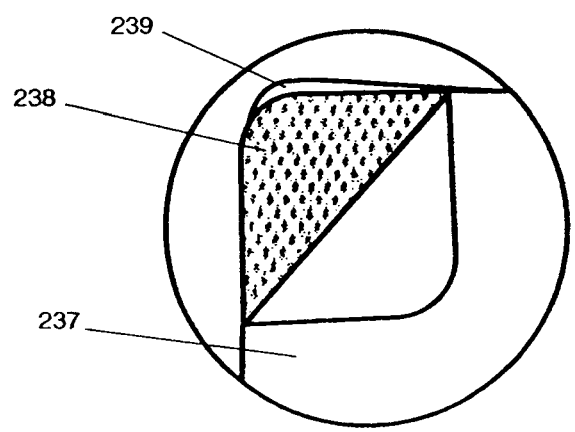

The breathable apparatus 200 shown generally in FIG. 9 may include one or more various types of objects. For example, as shown in FIG. 10A-10B, the breathable apparatus may take the form of an object used to cover a child or other human being. For example, as shown in FIG. 10A, a breathable blanket 220 including a body portion 222 formed of the breathable integrated padded mesh material is shown. Likewise, in FIG. 10B, a breathable comforter 230 is shown that includes a body portion 232 that is formed of the breathable integrated padded mesh material. It will be understood that the body portions 222, 232 may be trimmed using any various finishing materials. For example, trim 224 may be used along the edges of the breathable blanket 220, as shown in FIG. 10A, and trim 234 may be used to trim the breathable comforter 230 along its edges. Likewise, a breathable material 235 may be used in conjunction with the breathable integrated padded mesh material, as shown in FIG. 10B, as a back panel. In other words, the breathable integrated padded mesh material which forms the body portion may be configured as a single layer blanket or comforter formed only of the padded mesh material or the padded mesh material may be used in combination with one or more additional breathable layers as shown in FIG. 10C. For example, the configurations described above with reference to the crib shield systems may be used (e.g., cotton on one or both sides of the padded mesh material). As described above and as shown generally in FIG. 10C, the breathable integrated padded mesh material may be used in combination with one or more other material layers. For example, the breathable integrated padded mesh material may be used in combination with one or more layers of other material adjacent to (e.g., one material laid flat against the other) either the front substructure and/or back substructure of the breathable integrated padded mesh material. In FIG. 10C, one or more layers of material 237 may be used adjacent the front substructure of the breathable integrated padded mesh material 238 and/or one or more layers of material 239 may be used adjacent the back substructure thereof. One skilled in the art will recognize that various types of sizes and shapes may be used, as well as various types of breathable materials.

Figure 11A:
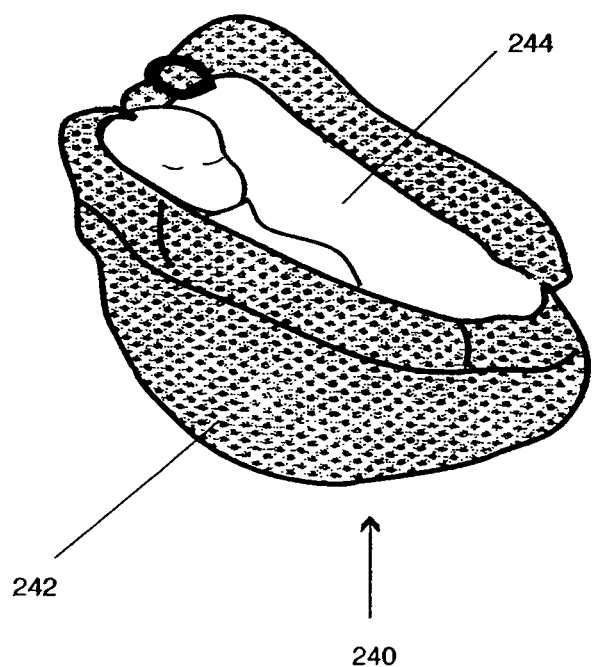
FIGS. 11A-11F show various illustrations of breathable apparatus, such as apparatus for carrying or receiving a small child (e.g., a baby) according to the present invention.

Further, the breathable apparatus 200 may take the form of one or more other carrying apparatus. For example, as shown in FIG. 11A, a breathable bundle 240 including a body portion 242 is shown for carrying a baby. The body member 242 defines a volume 244 for receiving a child.

Figure 11B:
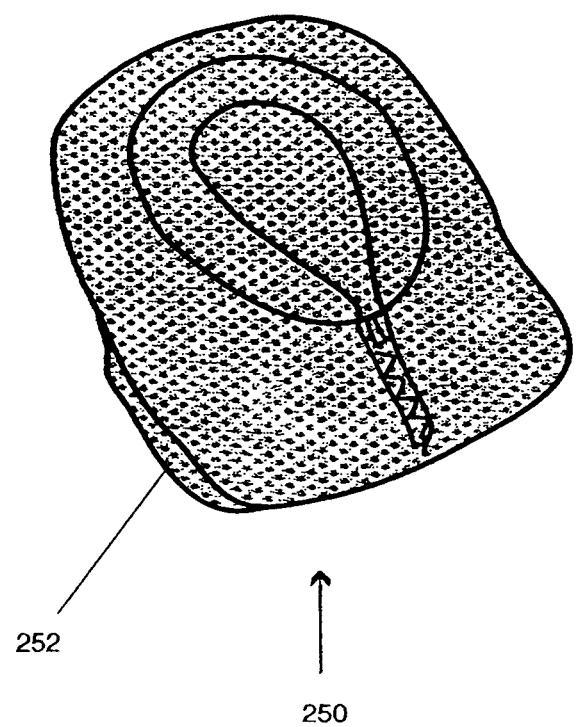

As shown in FIG. 11B, a breathable carrier cover 250 includes a body member 252 that defines a volume (not shown) in which a carrier is received.

Figure 11C:
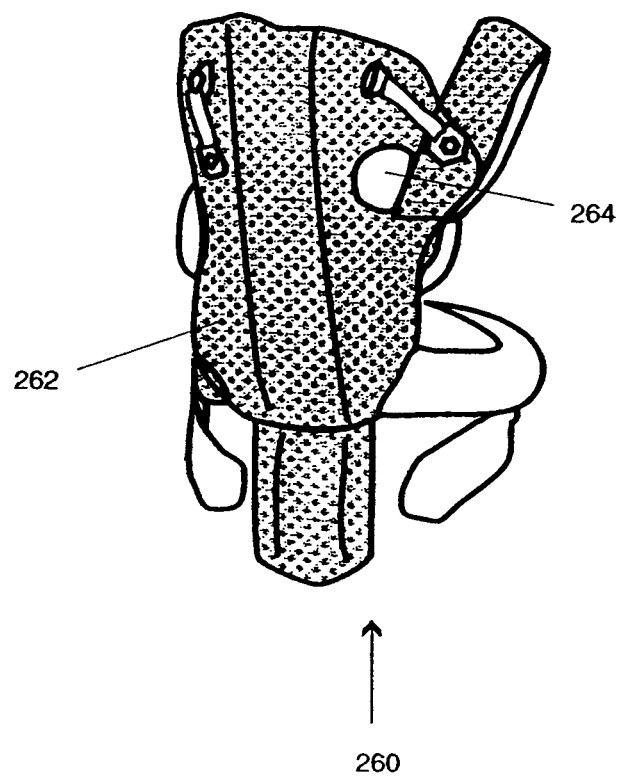

FIG. 11C shows an illustrative embodiment of a baby carrier 260. The baby carrier 260 includes a body portion 262 formed of at least a part of a breathable integrated padded mesh material according to the present invention that defines a volume 264 for receiving a child. As one skilled in the art will recognize, various attachment mechanisms for use in attaching the carrier to another person are required. However, a substantial portion of the one or more surfaces forming the carrier 260, particularly those that would exist next to a child's face, are preferably formed of the breathable integrated padded mesh material.

Figure 11D:
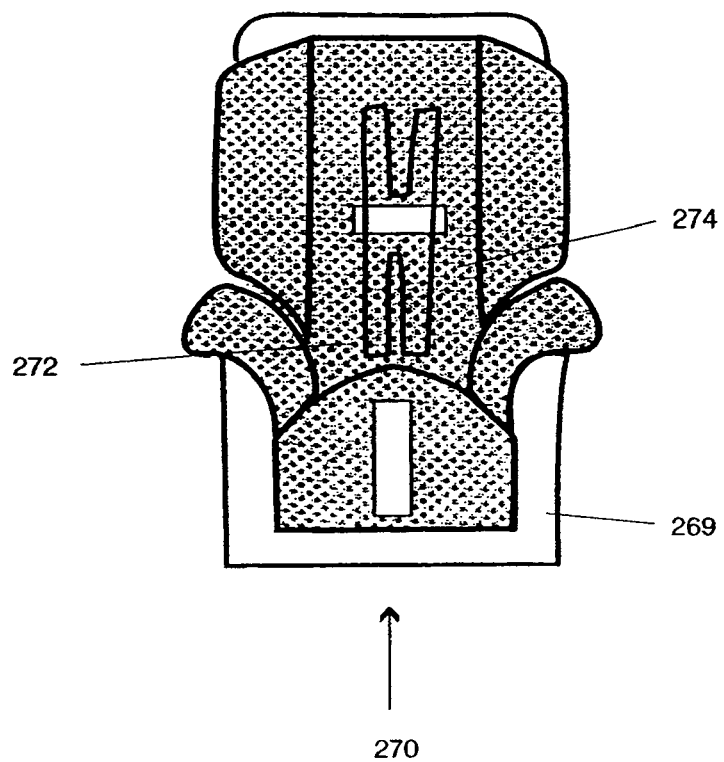

FIG. 11D shows a car seat cover 270 for a car seat 269 including a body portion 272 formed of the breathable integrated padded mesh material. The body portion 272 forms or defines a volume 274 in which a child is positioned. Once again, preferably, a substantial portion of all the surfaces of the car seat cover 270 are formed of the breathable integrated padded mesh material.

Figure 11E:
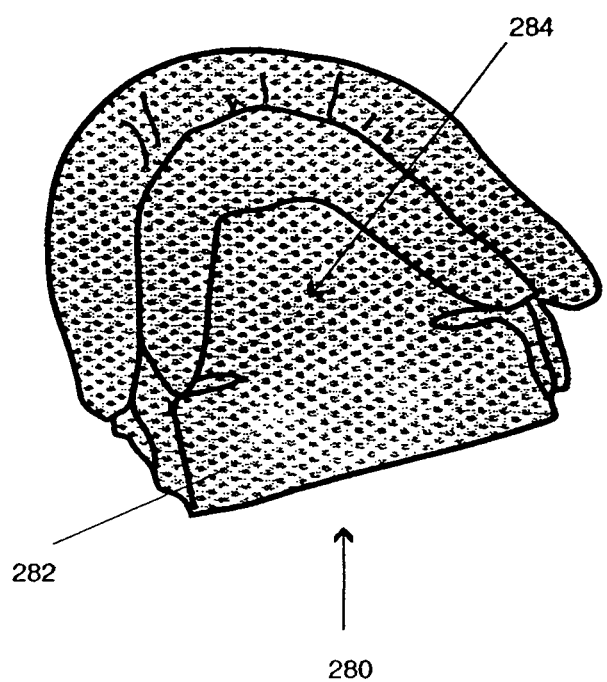

As shown in FIG. 11E, a double headrest 280 includes a body portion 282 formed of the breathable integrated padded mesh material. The body portion 282 defines a volume 284 for receiving, for example, the head of a child.

Figure 11F:
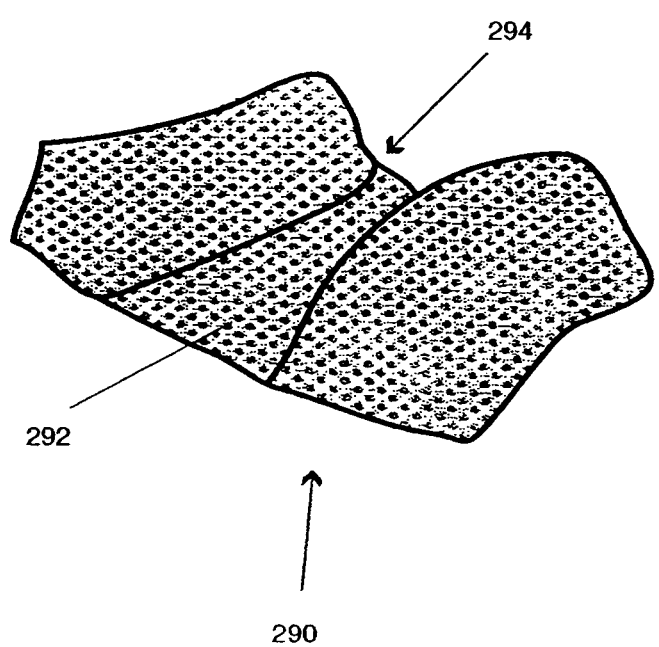

FIG. 11F shows a sleep positioner 290 including a body portion 292 formed of the breathable integrated padded mesh material. The body portion 292 provides a defined volume 294 for receiving a portion of a child's body.

One skilled in the art will recognize that various types of padding may be used in addition to the breathable integrated padded mesh material in order to form one or more of the shapes of the objects previously described herein. Further, for example, such padding materials may be the breathable integrated padded mesh material itself and/or other breathable materials, such as cotton, jersey, flannel, polyester, nylon, rayon, gabardine, terry cloth, etc.

Figure 12:
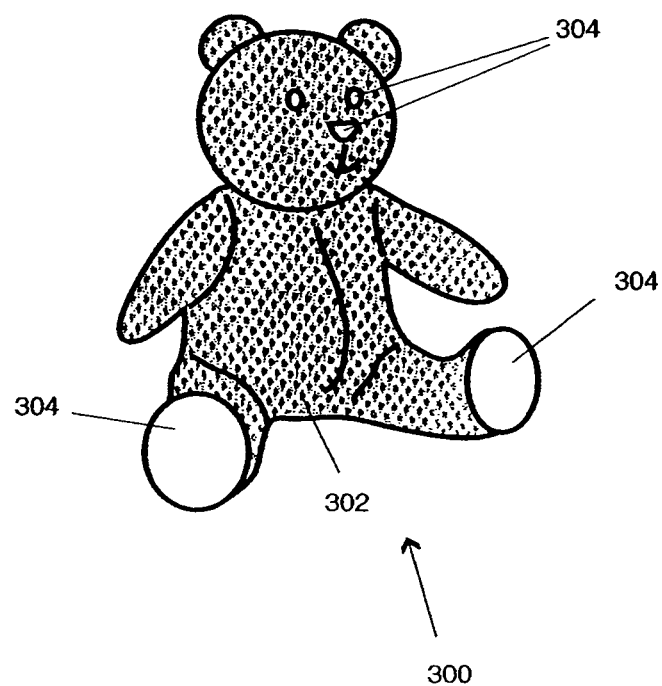
FIG. 12 shows an illustration of one embodiment of a breathable toy according to the present invention.

The breathable apparatus 200, shown generally in FIG. 9, may also take the form of a breathable toy 300, as shown in FIG. 12. The breathable toy 300, shown in FIG. 12 as a teddy bear, includes a body portion 302 formed of the breathable integrated padded mesh material. Further, trim material and various decorative elements 304 will be used to accessorize the body portion 302 (e.g., padded feet, a nose, eyes, etc.). Preferably, however, a majority of the toy 300 is covered with the breathable integrated padded mesh material.

Further, preferably, any single portion of trim material 304 of the toy 300 (or of any other apparatus described herein that includes the breathable padded mesh material) is smaller than that which could potentially block breathing of a child. Further, preferably, substantially the entire toy (or of any other apparatus described herein that includes the breathable padded mesh material) is formed of the breathable integrated padded mesh material. As used herein, when substantially the entire apparatus is formed of the breathable integrated padded mesh material at least two-thirds of the object is formed thereof. For example, some material may still be used for decorative or other trimming purposes, including additional padding. However, such material is kept to portions that are smaller than those which may potentially block breathing of a child (e.g., through mouth and nose of a child). Further, the breathable integrated padded mesh material may cover less than a substantial portion. For example, the breathable integrated padded mesh material may cover just a majority of the apparatus.

It will be recognized that the toy bear shown in FIG. 12 is but one illustrative embodiment of a toy that may utilize the breathable integrated padded mesh material. For example, dolls, or any other animal or stuffed toy, may be created using the breathable integrated padded mesh material.

Figure 13:
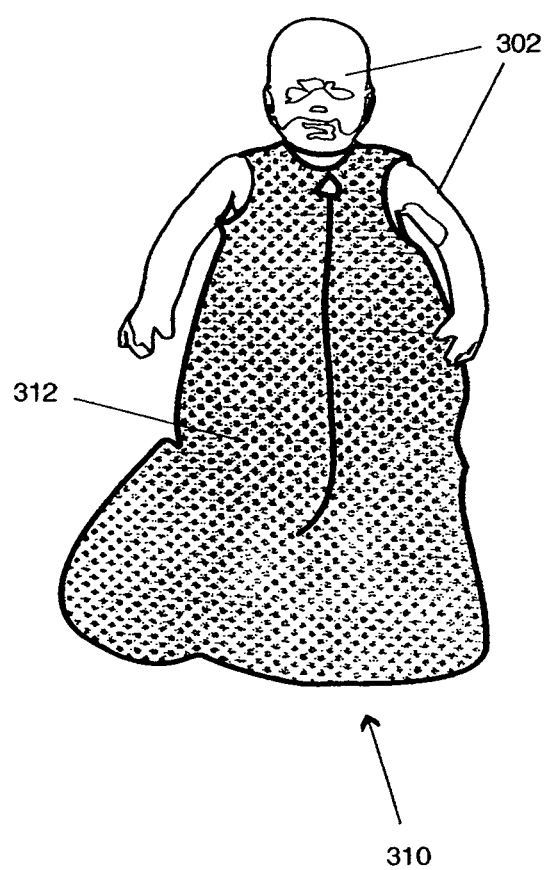
FIG. 13 shows a diagram of one embodiment of breathable clothing or wearables according to the present invention.

Yet further, the breathable apparatus 200 shown generally in FIG. 9 may take the form of breathable clothing or wearables, as shown in FIG. 13. For example, the breathable clothing 310 may include a body portion 312 that defines a volume (not shown) that may receive the body of a human or doll. Such clothing may be used as outerwear to be worn outside of other clothing or may be used as an inner layer or a single layer for covering the body of a human.

Although many of such breathable apparatus may be preferably used with respect to children (e.g., to prevent suffocation), such breathable apparatus, shown generally in FIG. 9, may also be used at other age levels. For example, geriatrics may utilize a blanket having the breathable features described herein or wear breathable clothing, such as shown generally in FIG. 13.

Further, the breathable integrated padded mesh material may be used with one or more of the following apparatus: Mats such as Play Gym Mats, Activity Mats, Sleeping Mats, Bath Mats, and Bathing Cushions; Activity and Soft Toys such as Hanging Soft Toys, Mobile Soft Toys, Musical Soft Toys, Interactive Soft Toys, Bath Soft Toys, Soft Toys with moving pieces, Car Seat Activity Centers, and Soft Dolls; Games such as Soft Puzzles, Soft Cutout Shapes, Soft Books, Cloth Books, and Photo Album Covers; Pads such as Mattress Pads, Changing Table Pads, Crib Pads, Crib Bumper Pads, Cradle Bumper Pads, Porta-Crib Bumper Pads, Play yard Covers and Pads, Sheet Savers, Contour Pads, Lap Burp Pads, and Floor Pads; Covers such as Changing Pad Covers, Dressing Table Pad Covers, Bouncer Covers, Swing Covers, Cradle Swing Covers, Seat Covers, Car Seat Covers, Carrier Covers, and Stroller Covers; Pillows such as Support Pillows, Wedges, Sleep Positioners, and Double Headrests; Blankets such as Comforters, Wearable Blankets, Receiving Blankets, and Stroller Blankets; Bags such as Nursery Organizers, Backpacks, Sleeping Bags, Luggage, Diaper Bags, and Carry Bags; Carriers such as Soft Carriers, Slings, and Bundles; Bedding such as Toddler Bedding, Crib Bedding, Cradle Bedding, Pillow Cases, and Pillow Case and Fitted Sheet in one; and Clothing such as Sports Clothing; Hats; Scarves; Jackets; Vests, and Outerwear.

The preceding described embodiments are illustrative of the practice of the invention. It is to be understood, therefore, that other expedients known to those skilled in the art or disclosed herein may be employed without departing from the invention or the scope of the appended claims. For example, various apparatus or steps of one embodiment described herein may be used with one or more other embodiments described herein to form various combinations of methods, systems, or apparatus contemplated by the present invention. As such, the present invention includes within its scope other methods, systems and apparatus for implementing and using the invention described herein.

What is claimed is:

1. A crib shield system, suitable for use with a crib, wherein the crib has a first and second side rail and a first and second endboard; wherein the first and second side rails and first and second-endboards are configured for receiving a rectangular-shaped mattress; wherein the crib also includes four corner posts, wherein each corner post is constructed as part of a side rail, an endboard, or both; wherein at least one of the first and second side rails or the first and second endboards has a horizontal top bar and a plurality of vertical spaced support elements, wherein the crib shield system comprises:

a first side panel configured to cover at least a substantial portion of the first side rail of the crib; wherein the first side panel further comprises:

an upper finishing edge portion, a middle breathable material body portion, and a bottom finishing edge portion;
        wherein the upper finishing edge portion, the middle breathable material body portion, and the bottom finishing edge portion each extend along the majority of the length from a first end of the first side panel to a second end of the first side panel, and
        wherein the middle breathable material body portion comprises a breathable material having openings too small to permit an infant to insert a finger or toe there through,
    wherein the first side panel comprises a first fastening apparatus attached to a first corner of the first side panel, said first fastening apparatus configured to attach a first corner of the first side panel to a first corner post of the crib,
a second side panel configured to cover at least a substantial portion of the second side rail of the crib;
a first end panel configured to cover at least a substantial portion of the first endboard of the crib;
a second end panel configured to cover at least a substantial portion of the second endboard of the crib; and
an underneath panel configured to fit underneath the rectangular-shaped mattress,
wherein the first side panel is sewn to the first end panel, and
wherein the underneath panel is sewn to the first side panel and the first end panel.

2. The crib shield system of claim 1, wherein the breathable material is comprised of a breathable mesh-type material.

3. The crib shield system of claim 2, wherein the breathable mesh-type material is a padded breathable mesh-type material.

4. The crib shield system of claim 3, wherein the padded breathable mesh-type material is comprised of a front substructure, a back substructure, and a pile substructure extending between the front and back substructures, wherein each of the substructures allows air to substantially move therethrough.

5. The crib shield system of claim 4, wherein the pile substructure is integrated with the front substructure, the back substructure, or both.

6. The crib shield system of claim 4, wherein the padded breathable mesh-type material has a suffocation resistance level of less than about 15 cm $H_2O$ as determined by RAM Consulting Virtual Child Suffocation Hazard Assessment Model.

7. The crib shield system of claim 1, wherein the middle breathable material body portion comprises a substantial portion of the width of the first side panel.

8. The crib shield system of claim 1, wherein the first side panel is configured so that the bottom finishing edge portion has a width substantially the same length as the height of the rectangular-shaped mattress, and
    wherein the width of the middle breathable material body portion is configured to begin at a top edge of the rectangular-shaped mattress and extends toward the horizontal top bar of the crib.

9. The crib shield system of claim 8, wherein the width of the middle breathable material body portion comprises a substantial portion of the width of the first side panel between a top edge of the rectangular-shaped mattress and the horizontal top bar of the crib.

10. The crib shield system of claim 1, wherein the width of the middle breathable material body portion comprises a substantial portion of the width of the first side panel between a top edge of the rectangular-shaped mattress and the horizontal top bar of the crib.

11. The crib shield system of claim 1, wherein the width of the middle breathable material body portion comprises a substantial portion of the width of the first side panel.

12. The crib shield system of claim 1, wherein the upper finishing edge portion comprises a padded portion.

13. The crib shield system of claim 1, wherein the underneath panel is comprised of fabric.

14. The crib shield system of claim 1, wherein the first side panel comprises a second fastening apparatus attached to a second corner of the first side panel, said second fastening apparatus configured to attach said second corner to a second corner post of the crib.

15. The crib shield system of claim 14, wherein the first side panel comprises at least one intermediate fastening apparatus located between the first corner and the second corner of the first side panel, said at least one intermediate fastening apparatus is configured to attach the first side panel to a third vertical spaced support element of the crib.

16. The crib shield system of claim 1, wherein the first side panel comprises at least one intermediate fastening apparatus located between the first corner and the second corner of the first side panel, said at least one intermediate fastening apparatus is configured to attach the first side panel to a third vertical spaced support element of the crib.

17. The crib shield system of claim 1, wherein the second side panel further comprises:
    a second side panel upper finishing edge portion, a second side panel middle breathable material body portion, and a second side panel bottom finishing edge portion;
        wherein the second side panel upper finishing edge portion, the second side panel middle breathable material body portion, and the second side panel bottom finishing edge portion each extend along the majority of the length from a first end of the second side panel to a second end of the second side panel, and
        wherein the second side panel middle breathable material body portion comprises a breathable material having openings too small to permit an infant to insert a finger or toe there through.

18. The crib shield system of claim 1, wherein the first end panel further comprises:
    a first end panel upper finishing edge portion, a first end panel middle breathable material body portion, and a first end panel bottom finishing edge portion;
        wherein the first end panel upper finishing edge portion, the first end panel middle breathable material body portion, and the first end panel bottom finishing edge portion each extend along the majority of the length from a first end of the first end panel to a second end of the first end panel, and
        wherein the first end panel middle breathable material body portion comprises a breathable material having openings too small to permit an infant to insert a finger or toe there through.

19. The crib shield system of claim 1, wherein the second end panel further comprises:
    a second end panel upper finishing edge portion, a second end panel middle breathable material body portion, and a second end panel bottom finishing edge portion;
        wherein the second end panel upper finishing edge portion, the second end panel middle breathable material body portion, and the second end panel bottom finishing edge portion each extend along the majority of the length from a first end of the second end panel to a second end of the second end panel, and wherein the second end panel middle breathable material body portion comprises a breathable material having openings too small to permit an infant to insert a finger or toe there through.

20. The crib shield system of claim 1, wherein the first fastening apparatus comprises a hook and loop fastener.

21. The crib shield system of claim 1, wherein the second side panel and the second end panel are each attached to at least three of the four other panels.

22. The crib shield system of claim 21, wherein the second side panel and the second end panel are each sewn to at least three of the four other panels.

23. The crib shield system of claim 1, wherein the breathable material is padded.

24. A crib shield system, suitable for use with a crib, wherein the crib has a first and second side rail and a first and second endboard; wherein the first and second side rails and first and second endboards are configured for receiving a rectangular-shaped mattress; wherein the crib also includes four corner posts, wherein each corner post is constructed as part of a side rail, an endboard, or both; wherein at least one of the first and second side rails or the first and second endboards has a horizontal top bar and a plurality of vertical spaced support elements, wherein the crib shield system comprises:

a first side panel configured to cover at least a substantial portion of the first side rail of the crib; wherein the first side panel further comprises:

a breathable material body portion that extends along the majority of the length from a first end of the first side panel to a second end of the first side panel, wherein the breathable material body portion comprises a breathable material having openings too small to permit an infant to insert a finger or toe there through;

wherein the first side panel comprises a first fastening apparatus attached to a first corner of the first side panel, said first fastening apparatus configured to attach the first corner of the first side panel to a first corner post of the crib, a second side panel configured to cover at least a substantial portion of the second side rail of the crib;

a first end panel configured to cover at least a substantial portion of the first endboard of the crib;

a second end panel configured to cover at least a substantial portion of the second endboard of the crib; and an underneath panel configured to fit underneath the rectangular-shaped mattress, wherein the first side panel, the second side panel, the first end panel, the second end panel, and the underneath panel are each sewn to at least three of the four other panels.

25. A crib shield system, suitable for use with a crib, wherein the crib has a first and second side rail and a first and second endboard; wherein the first and second side rails and first and second endboards are configured for receiving a rectangular-shaped mattress; wherein the crib also includes four corner posts, wherein each corner post is constructed as part of a side rail, an endboard, or both; wherein at least one of the first and second side rails or the first and second endboards has a horizontal top bar and a plurality of vertical spaced support elements, wherein the crib shield system comprises:

a first side panel configured to cover at least a substantial portion of the first side rail of the crib; wherein the first side panel further comprises:

an upper finishing edge portion, a middle breathable material body portion, and a bottom finishing edge portion;

wherein the upper finishing edge portion, the middle breathable material body portion, and the bottom finishing edge portion each extend along the majority of the length from a first end of the first side panel to a second end of the first side panel, and wherein the middle breathable material body portion comprises a breathable material having openings too small to permit an infant to insert a finger or toe there through, wherein the first side panel comprises a first fastening apparatus attached proximate to a first corner of the first side panel, said first fastening apparatus configured to attach the first corner of the first side panel to a first vertical spaced support element of the crib, a second side panel configured to cover at least a substantial portion of the second side rail of the crib;

a first end panel configured to cover at least a substantial portion of the first endboard of the crib;

a second end panel configured to cover at least a substantial portion of the second endboard of the crib; and an underneath panel configured to fit underneath the rectangular-shaped mattress, wherein the first side panel is sewn to the first end panel, and wherein the underneath panel is sewn to the first side panel and the first end panel.

26. The crib shield system of claim 25, wherein the first side panel comprises a second fastening apparatus attached proximate to a second corner of the first side panel, said second fastening apparatus configured to attach said second corner to a second vertical spaced support element of the crib.

27. The crib shield system of claim 26, wherein the first side panel comprises at least one intermediate fastening apparatus located between the first corner and the second corner of the first side panel, said at least one intermediate fastening apparatus is configured to attach the first side panel to a third vertical spaced support element of the crib.

28. The crib shield system of claim 25, wherein the first side panel comprises at least one intermediate fastening apparatus located between the first corner and the second corner of the first side panel, said at least one intermediate fastening apparatus is configured to attach the first side panel to a third vertical spaced support element of the crib.

29. The crib shield system of claim 25, wherein the breathable material is comprised of a breathable mesh-type material.

* * * * *